(12) United States Patent
Gonthier et al.

(10) Patent No.: US 12,067,458 B2
(45) Date of Patent: Aug. 20, 2024

(54) PARAMETER INITIALIZATION ON QUANTUM COMPUTERS THROUGH DOMAIN DECOMPOSITION

(71) Applicant: Zapata Computing, Inc., Boston, MA (US)

(72) Inventors: Jerome Florian Gonthier, Cambridge, MA (US); Maxwell D. Radin, Cambridge, MA (US)

(73) Assignee: Zapata Computing, Inc., Boston, MA (US)

( * ) Notice: Subject to any disclaimer, the term of this patent is extended or adjusted under 35 U.S.C. 154(b) by 477 days.

(21) Appl. No.: 17/506,456

(22) Filed: Oct. 20, 2021

(65) Prior Publication Data
US 2022/0121979 A1    Apr. 21, 2022

Related U.S. Application Data

(60) Provisional application No. 63/094,078, filed on Oct. 20, 2020.

(51) Int. Cl.
*G06F 15/16*    (2006.01)
*G06N 10/00*    (2022.01)

(52) U.S. Cl.
CPC ............. *G06N 10/00* (2019.01); *G06F 15/16* (2013.01)

(58) Field of Classification Search
USPC ................................ 716/100, 101, 106, 110
See application file for complete search history.

(56) References Cited

U.S. PATENT DOCUMENTS 7,353,148 B1    4/2008   Meyers
10,044,638 B2   8/2018   Dadashikelayeh
(Continued)

FOREIGN PATENT DOCUMENTS

CA    3151055 C    8/2022
CA    3133917 C    3/2023
(Continued)

OTHER PUBLICATIONS

Johnson, P.D., et al., "A Method for Improving Quantum Optimization Algorithms: The Marginals Optimization Procedure", ICE 5th Conference on Quantum Information, Spain, (May 28-31, 2019), Book of Abstracts p. 59.
(Continued)

*Primary Examiner* — Brian Ngo
(74) *Attorney, Agent, or Firm* — Blueshift IP; Robert Plotkin

(57) ABSTRACT

A system and method for initializing and optimizing a variational quantum circuit on a hybrid quantum-classical computer, comprising a set of gates and a set of initial parameters representing a model of a physical system. A quantum circuit is generated comprising a set of smaller contiguous subcomponents which can be independently optimized to minimize a property of the physical system, such as ground state energy or the absorption spectrum of a molecule. At least one entangling gate is introduced between at least two circuit subcomponents. The initial parameters of the circuit components may be set according to values obtained from a parameter library. Once the initial parameters are set, the circuit components of the quantum computer proceed to optimization, which is independent for each subcomponent of the system. The optimization method may also include the use of a variational quantum eigensolver (VQE).

44 Claims, 6 Drawing Sheets

(56) References Cited

U.S. PATENT DOCUMENTS

| | | | |
|---|---|---|---|
| 10,469,087 B1 | 11/2019 | Granade et al. | |
| 10,755,191 B2 | 8/2020 | Shim | |
| 10,832,155 B2 | 11/2020 | Lechner et al. | |
| 10,922,460 B1 | 2/2021 | Lee et al. | |
| 10,949,768 B1 | 3/2021 | Zeng | |
| 11,106,993 B1 | 8/2021 | Dallaire-Demers et al. | |
| 11,157,827 B2 | 10/2021 | Sim | |
| 11,436,519 B1* | 9/2022 | Dridi | G06N 10/60 |
| 11,574,030 B1* | 2/2023 | Harrigan | G06N 10/20 |
| 11,593,707 B2* | 2/2023 | Romero | G06N 20/00 |
| 11,615,329 B2 | 3/2023 | Wang et al. | |
| 11,657,196 B2* | 5/2023 | Greenberg | G06N 10/00 716/107 |
| 2007/0239366 A1 | 10/2007 | Hilton | |
| 2010/0306142 A1 | 12/2010 | Amin | |
| 2014/0187427 A1 | 7/2014 | MacReady | |
| 2015/0262072 A1 | 9/2015 | Stoltz | |
| 2016/0004972 A1 | 1/2016 | Alboszta et al. | |
| 2016/0042294 A1 | 2/2016 | MacReady | |
| 2016/0328253 A1 | 11/2016 | Majumdar | |
| 2017/0177751 A1 | 6/2017 | MacReady | |
| 2017/0177782 A1 | 6/2017 | Hastings | |
| 2017/0262765 A1 | 9/2017 | Bourassa | |
| 2017/0351967 A1 | 12/2017 | Babbush | |
| 2017/0357539 A1 | 12/2017 | Dadashikelayeh | |
| 2017/0364796 A1 | 12/2017 | Wiebe | |
| 2018/0129965 A1 | 5/2018 | Bocharov | |
| 2018/0232649 A1 | 8/2018 | Wiebe | |
| 2018/0232652 A1 | 8/2018 | Curtis | |
| 2018/0246851 A1 | 8/2018 | Zaribafiyan | |
| 2018/0322408 A1 | 11/2018 | Chen | |
| 2018/0330264 A1 | 11/2018 | Lanting | |
| 2019/0007051 A1 | 1/2019 | Sete | |
| 2019/0147359 A1 | 5/2019 | Chen | |
| 2019/0164079 A1 | 5/2019 | Gambetta | |
| 2019/0205783 A1 | 7/2019 | Nam | |
| 2019/0236476 A1 | 8/2019 | Pereverzev | |
| 2019/0251466 A1 | 8/2019 | Mezzacapo | |
| 2020/0005186 A1 | 1/2020 | Romero et al. | |
| 2020/0097848 A1 | 3/2020 | Woerner et al. | |
| 2020/0117702 A1 | 4/2020 | Babbush | |
| 2020/0151073 A1 | 5/2020 | Kelly | |
| 2020/0161529 A1 | 5/2020 | Chow | |
| 2020/0226487 A1 | 7/2020 | Radin et al. | |
| 2020/0272926 A1* | 8/2020 | Chaplin | G06F 30/337 |
| 2020/0274554 A1 | 8/2020 | Aspuru-Guzik et al. | |
| 2020/0334107 A1 | 10/2020 | Katabarwa | |
| 2020/0394537 A1 | 12/2020 | Wang | |
| 2020/0394549 A1 | 12/2020 | Dallaire-Demers | |
| 2021/0034998 A1 | 2/2021 | Cao | |
| 2021/0064350 A1* | 3/2021 | Cao | G06N 10/00 |
| 2021/0073668 A1 | 3/2021 | Dallaire-Demers | |
| 2021/0125096 A1 | 4/2021 | Puri | |
| 2021/0133617 A1 | 5/2021 | Sim | |
| 2021/0182726 A1 | 6/2021 | Harry Putra | |
| 2021/0216897 A1* | 7/2021 | Woerner | G06F 17/18 |
| 2021/0232963 A1 | 7/2021 | Gimeno-Segovia et al. | |
| 2021/0271731 A1 | 9/2021 | Stobinska et al. | |
| 2021/0272002 A1 | 9/2021 | Dallaire-Demers | |
| 2021/0312313 A1 | 10/2021 | Woerner | |
| 2022/0188679 A1 | 6/2022 | Mazzola | |
| 2022/0284337 A1 | 9/2022 | Radin et al. | |
| 2022/0292385 A1 | 9/2022 | Sauvage | |
| 2022/0335325 A1 | 10/2022 | Dallaire-Demers | |
| 2022/0391741 A1* | 12/2022 | McMahon | G06N 10/40 |
| 2023/0081927 A1 | 3/2023 | Zhang | |

FOREIGN PATENT DOCUMENTS

| | | |
|---|---|---|
| CN | 110188885 A | 8/2019 |
| CN | 114223003 A | 3/2022 |
| EP | 3983961 A1 | 4/2022 |
| EP | 4022530 A1 | 7/2022 |
| EP | 4026066 A1 | 7/2022 |
| EP | 4026066 A1 | 7/2022 |
| EP | 4042338 A1 | 8/2022 |
| EP | 4052194 | 9/2022 |
| EP | 4154193 A1 | 3/2023 |
| JP | 7223174 B2 | 2/2023 |
| KR | 20120016381 A | 2/2012 |
| KR | 20160132943 A | 11/2016 |
| TW | 201723935 A | 7/2017 |
| TW | 201945962 A | 12/2019 |
| TW | 764348 B | 5/2022 |
| WO | 2015069625 A1 | 5/2015 |
| WO | 2017001404 A1 | 1/2017 |
| WO | 2017027185 A1 | 2/2017 |
| WO | 2018064535 A1 | 4/2018 |
| WO | 2018212789 A1 | 11/2018 |
| WO | 2019050555 A1 | 3/2019 |
| WO | 2019055843 A1 | 3/2019 |
| WO | 2019104443 A1 | 6/2019 |
| WO | 2019126644 A1 | 6/2019 |
| WO | 2019150090 A1 | 8/2019 |
| WO | 2019152020 A1 | 8/2019 |
| WO | 2019209628 A1 | 10/2019 |
| WO | 2019220122 A1 | 11/2019 |
| WO | 2020146794 A1 | 7/2020 |
| WO | 2020168158 A1 | 8/2020 |
| WO | 2020214910 A1 | 10/2020 |
| WO | 2020252425 A1 | 12/2020 |
| WO | 2021022217 A1 | 2/2021 |
| WO | 2021046495 A1 | 3/2021 |
| WO | 2021062331 A1 | 4/2021 |
| WO | 2021087206 A1 | 5/2021 |
| WO | 2021102344 A1 | 5/2021 |
| WO | 2022087143 A1 | 4/2022 |
| WO | 2022187503 A1 | 9/2022 |
| WO | 2022192525 A1 | 9/2022 |
| WO | 2023043996 A1 | 3/2023 |

OTHER PUBLICATIONS

Jones T., and Benjamin S. C., et al., "Quantum compilation and circuit optimisation via energy dissipation", arXiv:1811.03147, pp. 1-13 (Dec. 19, 2018).

Jordan, P., et al., "In The Collected Works of Eugene Paul Wigner: Part A: The Scientific Papers—Chapter: Über das Paulische Äquivalenzverbot", pp. 109-129. Springer (1993).

Kandala, A., et al., "Hardware-efficient variational quantum eigensolver for small molecules and quantum magnets", Nature 549, pp. 1-24 (Oct. 13, 2017).

Kandala, A., et al., "Hardware-efficient Variational Quantum Eigensolver for Small Molecules and Quantum Magnets", Nature, vol. 549, pp. 1-24 (2017).

Kassal, I., et al., "Polynomial-time quantum algorithm for the simulation of chemical dynamics," Proceedings of the National Academy of Sciences, vol. 105, No. 48, pp. 1-6 (2008).

Kaushal, V., et al., "Shuttling-based trapped-ion quantum information processing", AVS Quantum Science, vol. 2, No. 1, pp. 1-25 (2020).

Kingma, D.P., and BA, J.L., "Adam: A method for stochastic optimization," arXiv preprint arXiv:1412.6980, pp. 1-15 (2014).

Kirby, W.M., and Love, P.J., "Classical simulation of noncontextual Pauli Hamiltonians," Physical Review A, vol. 102, No. 3, pp. 1-15 (Sep. 24, 2020).

Kirby, W.M., et al., "Contextual Subspace Variational Quantum Eigensolver," Quantum, vol. 5, pp. 1-18 (May 12, 2021).

Kirby, W.M., et al., "Contextuality Test of the Nonclassicality of Variational Quantum Eigensolvers," Physical review letters, vol. 123, No. 20, pp. 1-14 (Feb. 4, 2020).

Kitaev, A.Y., "Quantum Measurements and the Abelian Stabilizer Problem", arXiv preprint quant-ph/9511026, pp. 1-22 (Nov. 20, 1995).

Kitaev, A.Y., et al., "Classical and quantum computation," Graduate Studies in Mathematics, vol. 47, 2002, 24 pages. Editorial Committee: Steven G. Krantz, David Saltman, David Sattinger and Ronald Stern, American Mathematical Society; Providence, Rhode Island, United States of America.

(56) References Cited

OTHER PUBLICATIONS

Kivlichan, I. D., et al., "Quantum Simulation of Electronic Structure with Linear Depth and Connectivity", Phys. Rev. Lett. 120, arXiv:1711.04789v2, pp. 1-6 (Mar. 13, 2018).

Kjaergaard, M., et al., "Superconducting Qubits: Current State of Play", arXiv:1905.13641v2, pp. 1-28 (Jul. 26, 2019).

Knill, E., et al., "Optimal Quantum Measurements of Expectation Values of Observables," Physical Review A, 7(1), , p. 012328, pp. 1-22 (Jul. 3, 2006).

Kottmann, J.S., et al., "Reducing qubit requirements while maintaining numerical precision for the variational quantum eigensolver: A basis-set-free approach," The Journal of Physical Chemistry Letters 12.1, arXiv:2008.02819, pp. 663-673 (2021).

Kottmann, J.S., et al., "Reducing Qubit Requirements while Maintaining Numerical Precision for the Variational Quantum Eigensolver: A Basis-Set-Free Approach," The Journal of Physical Chemistry Letters, vol. 12, No. 1, pp. 1-13 (Dec. 31, 2020).

Krantz, P., et al., "A Quantum Engineer's Guide to Superconducting Qubits", Applied Physics Reviews, vol. 6, No. 2, 021318, pp. 1-59 (2019).

Kühn, M., et al., "Accuracy and Resource Estimations for Quantum Chemistry on a Near-Term Quantum Computer," Journal of Chemical Theory and Computation 15.9, pp. 1-26. arXiv:1812.06814 (Aug. 14, 2019).

Kyriienko, O., "Quantum inverse iteration algorithm for programmable quantum simulators," arXiv preprint arXiv:1901.09988, pp. 1-16 (Sep. 30, 2019).

Lee, S.J.R., et al., "Analytical Gradients for Projection-Based Wavefunction-in-DFT Embedding", arXiv:1903.05830v3, pp. 1-15 (Aug. 19, 2019).

Lemke, C., et al., "Metalearning: a survey of trends and technologies," Artificial Intelligence Review 44, 117 pp. 1-17 (2015).

Li, Z., et al., "Meta-sgd: Learning to learn quickly for few-shot learning," arXiv preprint arXiv:1707.09835, pp. 1-11 (Sep. 28, 2017).

Lieb, E.H., and Wu,F.Y., "The one-dimensional Hubbard model: a reminiscence," Physica A: Statistical Mechanics and its Applications 321, 1, arXiv:0207529, pp. 1-33 (2002).

Lin, L, and Tong, Y., "Heisenberg-limited ground state energy estimation for early fault-tolerant quantum computers," arXiv preprint arXiv:2102.11340, pp. 1-24 (Feb. 22, 2021).

Lin, L, and Tong, Y., "Near-optimal ground state preparation," Quantum, 4:372,arXiv:2002.12508, pp. 1-22 (Dec. 6, 2020).

Liu, J., and Wang, L., "Differentiable learning of quantum circuit Born machines", Phys. Rev. A 98, 062324, pp. 1-9 (2018).

Liu, Y., "The Complexity of the Consistency and N-Representability Problems for Quantum States", Quantum Physics, arXiv preprint arXiv:0712.3041, pp. 1-89 (2007).

Liu, Y., et al., "Quantum computational complexity of the N-representability problem: QMA complete", Physical review letters, vol. 98, No. 11, pp. 1-6 (2007).

Long, G.L., et al, "Phase Matching in Quantum Searching", arXiv:quant-ph/9906020v1, pp. 1-13 (Jun. 5, 1999).

Low, G.H., and Chuang, I.L., "Optimal Hamiltonian Simulation by Quantum Signal Processing", arXiv:1606.02685v2. pp. 1-6 (Dec. 20, 2016).

Low, G.H., et al., "Methodology of Resonant Equiangular Composite Quantum Gates", Physical Review X, vol. 6, No. 4, pp. 1-13 (2016).

Manby, F.R., et al., "A simple, exact density-functional-theory embedding scheme", Journal of Chemical Theory and Computation, 8 (8), pp. 2564-2568 (Jul. 17, 2012).

Manrique, D.Z., et al., "Momentum-Space Unitary Coupled Cluster and Translational Quantum Subspace Expansion for Periodic Systems on Quantum Computers," arXiv: 2008.08694 [quant-ph], pp. 1-31 (2021).

Mari, A., et al., "Estimating the gradient and higher-order derivatives on quantum hardware," Phys. Rev. A 103, 012405, pp. 1-17 (Feb. 26, 2021).

Maslov, D., "Basic Circuit Compilation Techniques for an Ion-Trap Quantum Machine", https://arxiv.org/pdf/1603.07678v4, pp. 1-18 (Feb. 21, 2017).

McArdle, S., et al., "Digital quantum simulation of molecular vibrations," Chemical science, 10(22):5725-5735, 2019. arXiv:1811.04069, pp. 1-14 (Jan. 23, 2020).

McArdle, S., et al., "Variational ansatz-based quantum simulation of imaginary time evolution," Nature Partner Journals: Quantum Information, vol. 5, No. 1, pp. 1-6 (2019).

McClean, J. R., et al., "The theory of variational hybrid quantum-classical algorithms", New Journal of Physics, vol. 18, pp. 1-22 (Feb. 5, 2016).

McClean, J.R., et al., "Barren plateaus in quantum neural network training landscapes," Nature communications, arXiv:1803.11173, pp. 1-6 (2018).

McClean, J.R., et al., "Decoding quantum errors with subspace expansions," Nat. Comm. 11, p. 636. doi: 10.1038/s41467-020-14341-pp. 1-9 (2020).

McClean, J.R., et al., "Hybrid Quantum-Classical Hierarchy for Mitigation of Decoherence and Determination of Excited States", Physical Review A, vol. 95, No. 4, pp. 1-10 (2017).

McClean, J.R., et al., "OpenFermion: the electronic structure package for quantum computers", Quantum Science and Technology 5.3, p. 034014, pp. 1-22 (2020).

McClean, J.R., et al., "The theory of variational hybrid quantum-classical algorithms," New Journal of Physics, vol. 18, No. 2, arXiv:1509.04279, pp. 1-20 (Sep. 14, 2015).

Meir, Y., and Wingreen., "Landauer formula for the current through an interacting electron region," Physical review letters, vol. 68, No. 16, pp. 2512-2516, (Apr. 20, 1992).

Michielsen, K., et al., "Benchmarking gate-based quantum computers", Quantum Physics, arXiv:1706.04341, vol. 220 pp. 1-33 (Jun. 14, 2017).

Mølmer, K., and Sørensen, A., "Multiparticle entanglement of hot trapped ions", arXiv:quant-ph/9810040v2, pp. 1-4 (Jan. 26, 1999).

Mostafa H., and Wang X., et al., "Parameter Efficient Training of Deep Convolutional Neural Networks by Dynamic Sparse Reparameterization", arXiv:1902.05967v3, pp. 1-18 (May 13, 2019).

Motta, M., et al., "Determining eigenstates and thermal states on a quantum computer using quantum imaginary time evolution," Nature Physics, vol. 16, No. 2, pp. 1-18 (Feb. 16, 2020).

Official Action mailed Sep. 29, 2022, in Canadian patent application No. 3,157,270, 5 pages.

Anirban Narayan Chowdhury et al., "Improved implementation of reflection operators", researchgate.net, Mar. 6, 2018, 12 pages. Available online at https://www.researchgate.net/publication/323627065_Improved_implementation_of_reflection_operators.

Extended European Search Report mailed Sep. 20, 2022, in European patent application No. 20738886.9, 10 pages.

A. Shabani et al., "Efficient measurement of quantum dynamics via compressive sensing," arxiv.org, Cornell University Library, 201 Olin Library Cornell University Ithaca, NY 14853, Oct. 28, 2009, XP080374481, DOI: 10.1103/PHYSREVLETT.106.100401, 9 pages.

M Mohseni et al., "Quantum Process Tomography: Resource Analysis of Different Strategies," arxiv.org, Cornell University Library, 201 Olin Library Cornell University Ithaca, NY 14853, Feb. 13, 2007, XP080275525, DOI: 10.1103/PHYSREVA.77.032322, 10 pages.

First Examination Report mailed Oct. 28, 2022, in Australian patent application No. 2020292425, 3 pages.

Decision to Grant mailed Jul. 19, 2022, in Taiwan patent application No. 109139876, 5 pages.

Examination Report mailed Aug. 24, 2022, in Canadian patent application No. 3,155,085, 4 pages.

Final Office Action mailed Aug. 25, 2022, in U.S. Appl. No. 16/543,165 of Peter D. Johnson, filed Aug. 16, 2019, 73 pages.

Frank Jensen, "Introduction to computational chemistry," John Wiley & Sons, Great Britain, 2017, 620 pages.

Non-Final Office Action mailed Aug. 3, 2022, in U.S. Appl. No. 16/900,947 of Guoming Wang, filed Jun. 14, 2020, 82 pages.

Second Examination Report mailed Aug. 2, 2022, in Canadian patent application No. 3,133,917, 3 pages.

(56) References Cited

OTHER PUBLICATIONS

Temme, K., et al., "Error Mitigation for Short-Depth Quantum Circuits", Physical review letters, vol. 119, No. 18, 180509, pp. 1-15 (2017).
Torlai, G., et al., "Neural-Network Quantum State Tomography", Nature Physics, vol. 14, No. 5, pp. 1-6 (Feb. 2018).
Tubman, N. M., et al., "Postponing the Orthogonality Catastrophe: Efficient State Preparation for Electronic Structure Simulations on Quantum Devices," Quantum Physics, arXiv:1809.05523, pp. 1-13, (Sep. 14, 2018).
Urbanek, M., et al., "Chemistry on Quantum Computers with Virtual Quantum Subspace Expansion," Journal of Chemical Theory and Computation 16.9, pp. 5425-5431. doi: 10.1021/acs.jctc.0c00447. (Feb. 28, 2020).
Verdon, G., et al., "Learning to learn with quantum neural networks via classical neural networks," arXiv:1907.05415, pp. 1-12 (Jul. 11, 2019).
Verstraete, F., et al., "Quantum Circuits for Strongly Correlated Quantum Systems", arXiv:0804.1888v1, pp. 1-5 (Apr. 11, 2008).
Verteletskyi, V., et al., "Measurement optimization in the variational quantum eigensolver using a minimum clique cover", Quantum Physics, arXiv:1907.03358v4, pp. 1-7 (Mar. 26, 2020).
Wang, D., et al., "Accelerated Variational Quantum Eigensolver", arXiv:1802.00171v3, pp. 1-11 (Mar. 25, 2019).
Wang, G., et al., "Bayesian Inference with Engineered Likelihood Functions for Robust Amplitude Estimation", arXiv:2006.09350v2, pp. 1-62 (Jun. 26, 2020).
Wang, G., et al., "Minimizing Estimation Runtime on Noisy Quantum Computers," PRX Quantum 2.1 pp. 010346-1-49 (2021).
Watson, J.D., et al., "The complexity of translationally invariant problems beyond ground state energies", arXiv preprint arXiv:2012.12717, pp. 1-58 (Dec. 23, 2020).
Wecker, D., et al., "Solving strongly correlated electron models on a quantum computer", Physical Review A, vol. 92, No. 6, pp. 1-27 (2015).
Wecker, D., et al., "Progress towards practical quantum variational algorithms", Phys. Rev. A 92, 042303, pp. 1-11 (Sep. 8, 2015).
Wecker, D., et al., "Towards Practical Quantum Variational Algorithms", Physical Review A, vol. 92, No. 4, 042303, pp. 1-11 (Sep. 8, 2015).
Wiebe, N., and Granade, C., "Efficient Bayesian Phase Estimation", arXiv:1508.00869v1, pp. 1-12 (Aug. 4, 2015).
Wiebe, N., et al., "Higher Order Decompositions of Ordered Operator Exponentials", Mathematical Physics, arXiv:0812.0562v3, pp. 1-16 (Dec. 4, 2008).
Willsch, M., et al., "Benchmarking the quantum approximate optimization algorithm," Quantum Information Processing 19, 197, pp. 1-24 (2020).
Wilson, M., et al., "Optimizing quantum heuristics with meta-learning," arXiv:1908.03185, pp. 1-13 (Aug. 8, 2019).
Wootton, J. R., "Benchmarking of quantum processors with random circuits", arXiv: Quantum Physics, arXiv:1806.02736v1, pp. 1-15 (Jun. 7, 2018).
Yen, T., et al., "Measuring all Compatible Operators in One Series of Single-Qubit Measurements Using Unitary Transformations," Journal of Chemical Theory and Computation, vol. 16, No. 4, pp. 1-12 (Mar. 14, 2020.) arXiv:1907.09386.
Yoder, T.J., et al., "Fixed-point quantum search with an optimal number of queries," Physical review letters, vol. 113, No. 21, pp. 210501-5 (Nov. 21, 2014).
Zhao, A., et al., "Measurement reduction in variational quantum algorithms", Quantum Physics, arXiv:1908.08067v2, pp. 1-21 (Dec. 16, 2019).
Zhou, L., et al., "Quantum approximate optimization algorithm: Performance, mechanism, and implementation on near-term devices," Phys. Rev. X, vol. 10, pp. 1-23 (2020).
Zhukov, A. A., et al., "Quantum communication protocols as a benchmark for quantum computers", arXiv:1812.00587v1, pp. 1-25 (Dec. 3, 2018).
Andersen, C.K., et al., "Entanglement stabilization using ancilla-based parity detection and real-time feedback in superconducting circuits," npj Quantum Information, vol. 5, No. 1, pp. 1-7 pages, XP055810501, DOI: 10.1038/s41534-019-0185-4 (Dec. 1, 2019).
Azad, U., and Singh, H., "Quantum Chemistry Calculations using Energy Derivatives on Quantum Computers," arXiv:2106.06463v1. pp. 1-12 (Jun. 10, 2021) [retrieved on Jan. 3, 2023]. Retrieved from <URL: https://arxiv.org/pdf/2106.06463.pdf>.
Bækkegaard, T., et al., "Realization of efficient quantum gates with a superconducting qubit-qutrit circuit," arXiv.org, Cornell University Library, 201 Olin Library Cornell University Ithaca, NY 14853, Feb. 12, 2018, 27 pages, XP081554230, DOI: 10.1038/s41598-019-49657-1.
Cai, X., et al., "Quantum computation of molecular response properties," Physical Review Research, pp. 1-7 (Aug. 27, 2020).
Decision to Grant mailed Jan. 17, 2023, in Japanese patent application No. 2021-571623, 5 pages.
Endo, S., et al., "Hybrid Quantum-Classical Algorithms and Quantum Error Mitigation," Journal of the Physical Society of Japan 90, pp. 1-33 (Feb. 1, 2021).
Extended European Search Report mailed Dec. 22, 2022, in European patent application No. 20890215.5, 10 pages.
Extended European Search Report mailed Jan. 12, 2023, in European Patent Application No. 20882002.7, 10 pages.
Extended European Search Report mailed Oct. 27, 2022, in European patent application No. 20868114.8, 10 pages.
First Office Action mailed Dec. 29, 2022, in Canadian patent application No. 3,141,547, 4 pages.
International Search Report and Written Opinion mailed Jan. 5, 2023, in international patent application No. PCT/US2022/043793, 8 pages.
Jansen, K., and Hartung, T., "Zeta-regularized vacuum expectation values from quantum computing simulations," arXiv:1912.01276v1. pp. 1-14. (Dec. 3, 2019) [retrieved on Jan. 3, 2023]. Retrieved from <URL: https://arxiv.org/pdf/1912.01276.pdf>.
Liu, Z., et al., "Some ground-state expectation values for the free parafermion Z(N) spin chain," arXiv:1905.08384v3. pp. 1-17 (Oct. 14, 2019) [retrieved on Jan. 3, 2023]. Retrieved from <URL: https://arxiv.org/pdf/1905.08384.pdf>.
McArdle, S., et al., "Quantum computational chemistry," arxiv.org, Cornell University Library, 201 Olin Library Cornell University Ithaca, NY 14853, pp. 1-59 XP081585393 (Aug. 30, 2018).
Non-Final Office Action mailed Dec. 6, 2022, in U.S. Appl. No. 16/543,165 of Peter D. Johnson, filed Aug. 16, 2019, 23 pages.
Non-Final Office Action mailed Dec. 8, 2022 for U.S. Appl. No. 16/740,177, of Maxwell D. Radin, filed Jan. 10, 2020, 85 pages.
Notice of Allowance mailed Dec. 22, 2022, in U.S. Appl. No. 16/900,947 of Guoming Wang, filed Jun. 14, 2020, 32 pages.
Notice of Allowance mailed Jan. 19, 2023, in Canadian patent application No. 3,133,917, 1 page.
Notice of Allowance mailed Mar. 30, 2023, in Canadian patent application No. 3,155,085, 1 page.
Pranav Gokhale et al., "Partial Compilation of Variational Algorithms for Noisy Intermediate-Scale Quantum Machines," Micro-52, Oct. 12-16, 2019, Columbus, OH, USA, 13 pages. XP58476958A. Available online at <https://doi.org/10.1145.3352460.3358313>.
Ryan Babbush et al., "Low Depth Quantum Simulation of Electronic Structure," Phys. Rev. X 8, 011044 (2018) 37 pages. Available online at <https://arxiv.org/pdf/1706.00023v2.pdf>.
Albash, T., et al., "Adiabatic quantum computation," Rev. Mod. Phys. 90, 015002, pp. 1-71 (2018).
Alcazar, J., et al., "Quantum algorithm for credit valuation adjustments", Quantum Physics, arXiv:2105.12087, pp. 1-23 (May 25, 2021).
Amaro, D., et al., "Filtering variational quantum algorithms for combinatorial optimization," arXiv preprint arXiv:2106.10055, pp. 1-14 (Feb. 10, 2022).
Ambainis, A., "On physical problems that are slightly more difficult than QMA," In 2014 IEEE 29th Conference on Computational Complexity (CCC), pp. 1-12 (2014).
Andersen, C.K., et al., "Entanglement Stabilization using Parity Detection and Real-Time Feedback in Superconducting Circuits", arXiv:1902.06946v2, pp. 1-12 (Feb. 20, 2019).

(56) References Cited

OTHER PUBLICATIONS

Arute, F., et al., "Quantum supremacy using a programmable superconducting processor", Nature, vol. 574, pp. 505-510 (Oct. 23, 2019).
Aspuru-Guzik, A., et al., "Simulated Quantum Computation of Molecular Energies", Science, Quantum Physics, vol. 309, No. 5741, pp. 1-21 (Sep. 9, 2005).
Atia, Y., and Aharonov, D., "Fast-Forwarding of Hamiltonians and Exponentially Precise Measurements," Nature communications, vol. 8, No. 1, pp. 1-9 (Nov. 17, 2017).
Babbush, R., et al., "Encoding Electronic Spectra in Quantum Circuits with Linear T Complexity," Physical Review X, vol. 8, No. 4, 041015, pp. 1-39 (Sep. 19, 2018).
Bach, V., et al., "Generalized Hartree-Fock Theory and the Hubbard Model", Journal of Statistical Physics, vol. 76 (1-2):3-89, pp. 1-68 (Nov. 25, 1993).
Baekkegaard, T., et al., "Realization of efficient quantum gates with a superconducting qubit-qutrit circuit", Scientific Reports, vol. 9, Article No. 13389, pp. 1-10 (Sep. 16, 2019).
Baker, J.M., et al., "Decomposing Quantum Generalized Toffoli with an Arbitrary Number of Ancilla", arXiv:1904.01671v1, pp. 1-10 (Apr. 2, 2019).
Balu, R., and Borle, A., "Bayesian Networks based Hybrid Quantum-Classical Machine Learning Approach to Elucidate Gene Regulatory Pathways", arXiv:1901.10557v1, pp. 1-9 (Jan. 23, 2019).
Bao, N., et al., "Universal Quantum Computation by Scattering in the Fermi-Hubbard model", arXiv:1409.3585v2, pp. 1-9 (Sep. 15, 2014).
Barenco, A., et al., "Elementary Gates for Quantum Computation", Physical review A, vol. 52, Issue No. 5, pp. 1-31 (Mar. 23, 1995).
Barkoutsos, P. K., et al., "Quantum Algorithms for Electronic Structure Calculations: Particle-Hole Hamiltonian and Optimized Wave-Function Expansions," Phys. Rev. A 98, 022322, pp. 1-14 (May 11, 2018).
Bedürftig, G., and Frahm, H., "Spectrum of boundary states in the open Hubbard chain", arXiv:cond-mat.9702227v1, pp. 1-14 (Feb. 26, 1997).
Benedetti, M., et al., "A generative modeling approach for benchmarking and training shallow quantum circuits", arXiv preprint arXiv:1801.07686v4, pp. 1-16 (Jun. 2, 2019).
Bergholm, V., et al., "Pennylane: Automatic differentiation of hybrid quantum-classical computations," arXiv preprint arXiv:1811.04968, pp. 1-15 (Feb. 14, 2020).
Bishop, L., et al., "Quantum Volume", Technical report, IBM T.J. Watson, pp. 1-5 (Mar. 4, 2017).
Bogoljubov, N.N., "A New Method in the Theory of Superconductivity", Soviet Physics JETP, vol. 34, No. 7, pp. 41-46 (Jul. 1958).
Bonet-Monroig, "Comparison of Error itigation Strategies in a Hydrogen Molecule Quantum Simulation", Master thesis. Leiden University, pp. 1-52 (May 29, 2018).
Bonet-Monroig, X., et al., "Nearly optimal measurement scheduling for partial tomography of quantum states", Quantum Physics, arXiv:1908.05628v2, pp. 1-9 (Sep. 6, 2019).
Bonet-Monroig, X., et al., "Performance comparison of optimization methods on variational quantum algorithms," arXiv preprint arXiv:2111.13454, pp. 1-12 (Dec. 14, 2021).
Bookatz, A. D., et al., "Error Suppression in Hamiltonian Based Quantum Computation Using Energy Penalties", arXiv:1407.1485v1, pp. 1-26 (Jul. 6, 2014).
Brandao, F.G., et al., "For fixed control parameters the quantum approximate optimization algorithm's objective function value concentrates for typical instances," arXiv preprint arXiv:1812.04170, pp. 1-16 (2018).
Brassard, G., et al., "Quantum Amplitude Amplification and Estimation", arXiv:quant-ph/0005055v1, pp. 1-22 (May 15, 2000).
Bravo-Prieto, C., et al., "Variational Quantum Linear Solver," Quantum Physics, arXiv:1909.05820, pp. 1-21 (Sep. 12, 2019).
Bravyi, L. D., et al., "Fermionic Quantum Computation", Annals of Physics, vol. 298, No. 1, pp. 210-226 (2002).
Bravyi, S., "Lagrangian Representation for Fermionic Linear Optics", arXiv:quant-ph/0404180v2, pp. 1-12 (Sep. 20, 2004).
Broughton, M., et al., "Tensorflow quantum: A software framework for quantum machine learning," arXiv preprint arXiv:2003.02989, pp. 1-56 (Aug. 26, 2021).
Cao, Y., et al., "Implementation of a Toffoli gate using an array of coupled cavities in a single step", Scientific Reports, vol. 8, Article No. 5813, pp. 1-10 (Apr. 11, 2018).
Cao, Y., et al., "Potential of Quantum Computing for Drug Discovery," IBM Journal of Research and Development, vol. 62, Issue 6, pp. 6:1-6:20, (Dec. 2018).
Cao, Y., et al., "Quantum Chemistry in the Age of Quantum Computing", Quantum Physics, arXiv:1812.09976v2, pp. 1-194 (Dec. 28, 2018).
Cerezo, M., et al., "Cost function-dependent barren plateaus in shallow quantum neural networks," arXiv preprint arXiv:2001.00550, pp. 1-39 (Mar. 20, 2021).
Cervera-Lierta, A., et al., "The meta-variational quantum eigensolver (meta-vqe): Learning energy profiles of parameterized hamiltonians for quantum simulation," arXiv:2009.13545, pp. 1-11 (May 28, 2021).
Chakraborty, S., et al., "The Power of Blockencoded Matrix Powers: Improved Regression Techniques Via Faster Hamiltonian Simulation," arXiv preprint arXiv:1804.01973, pp. 1-58 (Sep. 3, 2018).
Childs, A. M. et al., "Hamiltonian simulation using linear combinations of unitary operations", Quantum Information and Computation, vol. 12, pp. 901-924 (2012).
Childs, A. M., et al., "Quantum algorithm for systems of linear equations with exponentially improved dependence on precision", arXiv:1511.02306v2, pp. 1-31 (2017).
Chiles, R.A., et al., "An electron pair operator approach to coupled cluster wave functions. application to He2, Be2, and Mg2 and comparison with CEPA methods", The Journal of Chemical Physics, vol. 74, No. 8, pp. 4544-4556 (1981).
Colless, J.I., et al., "Computation of Molecular Spectra on a Quantum Processor with an Error-Resilient Algorithm", Physical Review X, vol. 8, No. 1, pp. 011021-011027 (2018).
Cramer, M., et al., "Efficient Quantum State Tomography", Nature communications, 1(149), pp. 1-7 (Dec. 21, 2010).
Crawford, O., et al., "Efficient quantum measurement of Pauli operators in the presence of finite sampling error", Quantum Physics, arXiv:1908.06942v2, pp. 1-17 (Apr. 21, 2020).
Crooks, G.E., "Performance of the quantum approximate optimization algorithm on the maximum cut problem," arXiv preprint arXiv:1811.08419, pp. 1-6 (2018).
Dallaire-Demers, P. L., et al., "An application benchmark for fermionic quantum simulations", arXiv:2003.01862v1, pp. 1-14 (Mar. 4, 2020).
Dallaire-Demers, P.L., and Killoran, N., "Quantum generative adversarial networks", arXiv:1804.08641v2, Phys. Rev. A, vol. 98, 012324, pp. 1-10 (Apr. 30, 2018).
Dallaire-Demers, P.L., et al., "Low-depth circuit ansatz for preparing correlated fermionic states on a quantum computer", Quantum Physics, arXiv:1801.01053v1, pp. 1-15 (Jan. 3, 2018).
Decision of Grant mailed Jan. 20, 2022, in Taiwan patent application No. 109137856, 5 pages.
Dumitrescu, E., et al., "Tensor Network Benchmarking for Quantum Computing", Beyond CMOS Computing Workshop: The Interconnect Challenge, Session 1, Talk 4, pp. 1-25 (2017).
Eddins, A., et al., "Doubling the Size of Quantum Simulators by Entanglement Forging," Quantum Physics, arXiv:2104.10220, pp. 1-17 (Apr. 20, 2021).
Second Office Action mailed Apr. 6, 2022, in Taiwan patent application No. 109139876, 3 pages (English translation included).
Notice of Allowance mailed May 18, 2022, in Canadian patent application No. 3,151,055, 1 page.
Endo, S., et al., "Variational quantum algorithms for discovering Hamiltonian spectra", Physical Review A, arXiv preprint arXiv:1806.05707, pp. 1-9 (2018).
Essler, F. H. L., et al., "The one-dimensional Hubbard model", Cambridge University Press, pp. 1-753. (Dec. 11, 2003).
Esslinger, T., "Fermi-Hubbard physics with atoms in an optical lattice", arXiv:1007.0012v1, pp. 1-29 (Jun. 30, 2010).

(56) References Cited

OTHER PUBLICATIONS

Examination Report mailed Dec. 22, 2021, in Canadian patent application No. 3,133,917, 5 pages.
Farhi, E., et al., "A quantum approximate optimization algorithm", Quantum Physics, arXiv:1411.4028v1, pp. 1-16 (Nov. 14, 2014).
Fedorov, A., et al., "Implementation of a Toffoli Gate with Superconducting Circuits", arXiv:1108.3966v1, pp. 1-5 (Aug. 19, 2011).
Ferrie, C., et al., "How to Best Sample a Periodic Probability Distribution, or on the Accuracy of Hamiltonian Finding Strategies", Quantum Information Processing, arXiv:1110.3067v1, pp. 1-8 (Oct. 13, 2011).
Figgat, C., et al., "Complete 3-Qubit Grover search on a programmable quantum computer", Nature Communications, vol. 8, Article No. 1918, pp. 1-9 (2017).
Finn, C., and Levine, S., "Meta-learning and universality: Deep representations and gradient descent can approximate any learning algorithm," arXiv:1710.11622, pp. 1-20 (Feb. 14, 2018).
First Office Action mailed May 14, 2021, in Taiwan patent application No. 109139876, 9 pages (English translation Included).
First Office Action mailed Oct. 8, 2021, in Taiwan patent application No. 109137856, 5 pages.
Frerot, I., et al., "Detecting Many-Body Bell Non-Locality By Solving Ising Models", Phys. Rev. Lett. 126, 140504, Available online at <https://arxiv.org/pdf/2004.07796, pp. 1-14 (Apr. 10, 2021).
Garcia-Saez, A., et al., "Addressing Hard Classical Problems with Adiabatically Assisted Variational Quantum Eigensolvers", Quantum Physics, arXiv preprint arXiv:1806.02287, pp. 1-7 (2018).
Ge, Y., et al., "Faster Ground State Preparation and High-Precision Ground Energy Estimation with Fewer Qubits," Journal of Mathematical Physics, vol. 60, No. 2,: arXiv:1712.03193, 1-25 (Feb. 2, 2018).
Gentini, L., et al., "Noise-Assisted Variational Hybrid Quantum-Classical Optimization", arXiv:1912.06744, pp. 1-8 (Dec. 13, 2019).
Ghamami, S., and Zhang, B., et al., "Efficient Monte Carlo Counterparty Credit Risk Pricing and Measurement", Journal of Credit Risk, vol. 10, No. 3, pp. 1-42 (Jul. 23, 2014).
Gharibian, S., et al., "Oracle Complexity Classes and Local Measurements on Physical Hamiltonians," In 37th International Symposium on Theoretical Aspects of Computer Science (STACS 2020). Schloss Dagstuhl-Leibniz-Zentrum für Informatik, 2020. arXiv:1909.05981, pp. 1-38 (Sep. 12, 2019).
Gharibian, S., et al., "The complexity of simulating local measurements on quantum systems," Quantum, 3:189, 2019. arXiv:1606.05626, pp. 1-38 (Apr. 7, 2020).
Gilyén, A., et al., "Quantum Singular Value Transformation and Beyond: Exponential Improvements for Quantum Matrix Arithmetics," In Proceedings of the 51st Annual ACM SIGACT Symposium on Theory of Computing, pp. 193-204, 2019. arXiv:1806.01838, Jun. 5, 2018, 67 pages.
Goemans, M.X., et al., "Improved Approximation Algorithms for Maximum Cut and Satisfiability Problems Using Semidefinite Programming", Journal of the ACM (JACM), vol. 42, No. 6, pp. 1115-1145 (Nov. 1995).
Gokhale, P., and Chong, F.T., "O(N3) Measurement Cost for Variational Quantum Eigensolver on Molecular Hamiltonians", arXiv:1908.11857v1, pp. 1-5 (Aug. 30, 2019).
Gokhale, P., et al., "Minimizing state preparations in variational quantum eigensolver by partitioning into commuting families", Quantum Physics, arXiv:1907.13623v1, pp. 1-23 (Jul. 31, 2019).
Gonthier, J., et al., "Identifying challenges towards practical quantum advantage through resource estimation: the measurement roadblock in the variational quantum eigensolver," Quantum Physics, arXiv:2012.04001, pp. 1-27 (Dec. 7, 2020).
Grant, E., et al., "An initialization strategy for addressing barren plateaus in parametrized quantum circuits," Quantum 3, 214, pp. 1-9 (Nov. 28, 2019).
Grimsley, H.R., et al., "An adaptive variational algorithm for exact molecular simulations on a quantum computer," Nature Communications 10, 3007, pp. 1-9 (2019).
Grover, L.K., "A fast quantum mechanical algorithm for database search", STOC '96: Proceedings of the twenty-eighth annual ACM symposium on Theory of Computing, pp. 1-8 (Jul. 1996).
Handy, N.C., et al., "Size-consistent Brueckner theory limited to double substitutions", Chemical Physics Letters, vol. 164, No. 2-3, pp. 185-192 (Dec. 8, 1989).
Harrow, A. W., et al., "Quantum algorithm for linear systems of equations", Phys. Rev. Lett., vol. 103, No. 15, 1-15 (2009).
He, M., et al., "Quantum Gaussian filter for exploring ground-state properties," arXiv preprint arXiv:2112.06026, pp. 1-7 (Dec. 11, 2021).
Helgaker T. et al., "Molecular Electronic-Structure Theory", Book published by John Wiley & Sons, pp. 1-908 (2000).
Heya, K., et al., "Variational Quantum Gate Optimization", Quantum Physics, arXiv:1810.12745v1, pp. 1-10 (Oct. 30, 2018).
Higgott, O., et al., "Variational Quantum Computation of Excited States," Quantum, vol. 3, pp. 1-11 (Jun. 28, 2019).
Hospedales. T., et al., "Meta-Learning in Neural Networks: A Survey," arXiv e-prints , arXiv:2004.05439, pp. 1-20 (Nov. 7, 2020).
Hoyer, P., et al., "On Arbitrary Phases in Quantum Amplitude Amplification", arXiv:quant-ph/0006031v1, pp. 1-6 (Jun. 7, 2000).
Huang, H., et al., "Near-term quantum algorithms for linear systems of equations," arXiv preprint arXiv:1909.07344, pp. 1-22 (Dec. 16, 2019).
Huggins, W. J., et al., "Efficient and noise resilient measurements for quantum chemistry on near-term quantum computers", Quantum Physics, arXiv:1907.13117v3, pp. 1-10 (Sep. 23, 2019).
International Search Report & Written Opinion mailed Dec. 11, 2020, in international patent application No. PCT/US2020/049605, 14 pages.
International Search Report & Written Opinion mailed Feb. 18, 2021, in international patent application No. PCT/US2020/058119, 7 pages.
International Search Report & Written Opinion mailed Jan. 5, 2021, in international patent application No. PCT/US2020/052958, 7 pages.
International Search Report & Written Opinion mailed Jul. 27, 2020, in international patent application No. PCT/US2020/028670, 7 pages.
International Search Report & Written Opinion mailed May 11, 2020, in International Patent Application No. PCT/US2020/013181, 11 pages.
International Search Report & Written Opinion mailed Nov. 6, 2020, in international patent application No. PCT/US2020/044615, 8 pages.
International Search Report & Written Opinion mailed Sep. 6, 2021, in international patent application PCT/US2021/033089, 8 pages.
International Search Report and Written Opinion mailed Dec. 6, 2019 in PCT International Patent Application No. PCT/US2019/046895, 9 pages.
International Search Report and Written Opinion for the international application No. PCT/US2021/035381, mailed on Sep. 27, 2021, 6 pages.
International Search Report and Written Opinion mailed Feb. 4, 2022, in International Patent Application No. PCT/US2021/055867, 6 pages.
International Search Report and Written Opinion mailed Mar. 15, 2021, in International Patent Application No. PCT/US2020/061631, 7 pages.
International Search Report and Written Opinion mailed Sep. 21, 2020, in international patent application No. PCT/US2020/037655, pp. 1-8.
Izmaylov, A. F., et al., "Unitary Partitioning Approach to the Measurement Problem in the Variational Quantum Eigensolver Method", Quantum Physics, arXiv:1907.09040v2, pp. 1-7 (Oct. 18, 2019).
Johnson, P. D., et al., "QVECTOR: an algorithm for device-tailored quantum error correction", arXiv preprint arXiv:1711.02249v1, pp. 1-16 (Nov. 7, 2017).
"Quantum Computing: Progress and Prospects" National Academies of Sciences, Engineering, and Medicine, pp. 1-273 (2019).

(56) References Cited

OTHER PUBLICATIONS

Benedetti, M., et al., "Parameterized quantum circuits as machine learning models," arXiv:1906.07682v2, pp. 1-18 (Oct. 10, 2019). Available online at <https://arxiv.org/abs/1906.07682v2>.

Colless, J.I., et al., "Robust determination of molecular spectra on a quantum processor," arxiv.org. Cornell University Library, 201 Olin Library Cornell University Ithaca, NY 14853, XP081278642, DOI: 10.1103/physrevx.8.011021, pp. 1-12 (Jul. 20, 2017).

Dyakonov, M., "The case against Quantum Computing", IEEE Spectrum, pp. 1-5 (Nov. 15, 2018).

Endo, S., et al., "Hybrid quantum-classical algorithms and quantum error mitigation," arXiv.2011.01382v1, pp. 1-39 (Nov. 2, 2020) Available online at [https://arxiv.org/abs/2011.01382].

Extended European Search Report mailed Jun. 22, 2022, in European patent application No. 20791186.8, 8 pages.

Extended European Search Report mailed May 19, 2022, in European patent application No. 19850377.3, 10 pages.

Hempel, C. et al., "Quantum chemistry calculations on a trapped-ion quantum simulator," arxiv.org. Cornell University Library, 201 Olin Library Cornell University Ithaca, NY 14853, XP080859698, pp. 1-21 (Mar. 27, 2018).

Horgan, J., "Will Quantum Computing Ever Live Up to Its Hype?", Quantum Computing, Scientific American, pp. 6 (Apr. 20, 2021).

Huang, C., et al., "Classical Simulation of Quantum Supremacy Circuits," arXiv:2005.06787v1., pp. 1-28 (May 14, 2020) Available online at [https://arxiv.org/abs/2005.06787].

International Search Report & Written Opinion mailed Jun. 15, 2022, in international patent application No. PCT/US2022/018727, 9 pages.

International Search Report & Written Opinion mailed Jun. 28, 2022, in international patent application No. PCT/US2022/019724, 9 pages.

Johnson, P.D., et al., "QVECTOR: an algorithm for device-tailored quantum error correction," pp. 1-16, XP055553548, (Nov. 7, 2017) Retrieved from the Internet at <URL:https://arxiv.org/pdf/1711.02249.pdf.

Moll, N., et al, "Quantum optimization using variational algorithms on near-term quantum devices," Quantum Science and Technology, vol. 3, pp. 18 (Jun. 19, 2018) [retrieved on Nov. 25, 2019]. Retrieved from <https://iopscience.iop.org/article/10.1088/2058-9565/aab822/pdf>.

Non-Final Office Action mailed May 11, 2022, in U.S. Appl. No. 16/543,165 of Peter D. Johnson, filed Aug. 16, 2019, 26 pages.

Preskill, J., "Quantum Computing in the NISQ era and beyond", pp. 1-20 (Jul. 31, 2018).

Sauvage, F., et al, "FLIP: A flexible initializer for arbitrarily-sized parametrized quantum circuits," https://arxiv.org/abs/2103.08572v2, 15 pages, (May 5, 2021).

Xia, R., and Kais, S., "Hybrid Quantum-Classical Neural Network for Calculating Ground State Energies of Molecules," Entropy, vol. 22, No. 8, pp. 1-12 (Jul. 29, 2020) Available online at [https://doi.org/10.3390/e22080828].

Motta, M., et al., "Low rank representations for quantum simulation of electronic structure", Computational Physics, Quantum Physics, arXiv:1808.02625v2, pp. 1-8 (Aug. 9, 2018).

Nakanishi, K.M., et al., "Subspace-search variational quantum eigensolver for excited states," Phys. Rev. Research 1, p. 033062. doi: 10.1103/PhysRevResearch.1.033062-1-7 (Oct. 3, 2019).

Nelder, J. A., and Mead, R., "A simplex method for function minimization", The Computer Journal, vol. 7, Issue. 4, pp. 308-313 (Jan. 1965).

Nichol, A., et al., "On first-order meta-earning algorithms," arXiv:1803.02999, pp. 1-15 (Oct. 22, 2018).

Nielsen, M. A., and Chuang, I. L., "Quantum Computation and Quantum Information", Cambridge University Press, pp. 1-704 (2000).

Nielsen, M.A., et al, "Quantum Computation as Geometry", arXiv:quant-ph/0603161v2, pp. 1-13 (Mar. 21, 2006).

Non-Final Office Action mailed Jun. 10, 2021, in U.S. Appl. No. 17/084,990 of Sukin Sim, filed Oct. 30, 2020, 20 pages.

Notice of Allowance mailed Aug. 12, 2021, in U.S. Appl. No. 17/084,990 of Sukin Sim, filed Oct. 30, 2020, 5 pages.

Notice of Allowance mailed Aug. 27, 2021, in U.S. Appl. No. 17/084,990 of Sukin Sim, filed Oct. 30, 2020, 5 pages.

Notice of Allowance mailed Jun. 28, 2021, for U.S. Appl. No. 17/033,727 of Pierre-Luc Dallaire-Demers, filed Sep. 26, 2020, 32 pages.

O'Brien, T. E., et al., "Calculating energy derivatives for quantum chemistry on a quantum computer," NPJ Quantum Information, vol. 5, No. 1, pp. 1-12 (2019).

O'Gorman, B., et al., Generalized swap networks for near-term quantum computing, arXiv: 1905.05118 [quant-ph]., pp. 1-16 (May 13, 2019).

Parrish, R.M., et al., "Quantum Computation of Electronic Transitions Using a Variational Quantum Eigensolver," Physical Review Letters, vol. 122, No. 23, pp. 1-13 (Apr. 10, 2019).

Peruzzo, A., et al., "A variational eigenvalue solver on a photonic quantum processor", Nature Communications, vol. 5, Article No. 4213, pp. 1-7 (2014).

Peruzzo, A., et al., "A variational eigenvalue solver on a quantum processor", Quantum Physics, arXiv:1304.3061v1, pp. 1-10 (Apr. 10, 2013).

Pino, J.M., et al., "Demonstration of the QCCD trapped-ion quantum computer architecture", arXiv:2003.01293, pp. 1-11 (Sep. 26, 2020).

Potthoff, M., "Chapter 1: Self-energy-functional theory", arXiv:1108.2183, pp. 1-38 (Aug. 10, 2011).

Poulin, D., and Wocjan, P., "Preparing ground states of quantum many-body systems on a quantum computer," Physical review letters, vol. 102, No. 13, 130503, pp. 1-7 (Sep. 16, 2008).

Powell, M. J. D., "A Direct Search Optimization Method That Models the Objective and Constraint Functions by Linear Interpolation", In: Gomez S., Hennart JP. (eds) Advances in Optimization and Numerical Analysis. Mathematics and Its Applications, vol. 275. Springer, Dordrecht, pp. 51-52 (1994).

Purvis, G.D., et al., "A full coupled-cluster singles and doubles model: The inclusion of disconnected triples", The Journal of Chemical Physics, vol. 76, No. 4, pp. 1910-1918 (Feb. 15, 1982).

R. L. Fox et al., "Rates of change of eigenvalues and eigenvectors," AIAA Journal 6.12 (1968), pp. 2426-2429.

Reiher, M., et al., "Elucidating Reaction Mechanisms on Quantum Computers", PNAS, vol. 114, No. 29, pp. 1-28 (2016).

Rice, J.E., et al., "Quantum computation of dominant products in lithium-sulfur batteries," The Journal of Chemical Physics, 154(13):134115, 2021. arxiv2001.01120, pp. 1-7 (Jan. 4, 2020).

Robbins, K., and Love, P.J., "Benchmarking VQE with the LMG model," arXiv: 2105.06761 [quant-ph]. pp. 1-15 (Aug. 2, 2021).

Robert M. Parrish et al., "Psi4 1.1: An Open-Source Electronic Structure Program Emphasizing Automation, Advanced Libraries, and Interoperability," J. Chem. Theory Comput. 13.7 (2017), pp. 3185-3197. doi: 10.1021/acs.jctc.7b00174. url: http://dx.doi.org/10.1021/acs.jctc.7b00174.

Rodriguez-Lujan, I., et al., "Quadratic Programming Feature Selection", The Journal of Machine Learning Research, vol. 11, pp. 1491-1516 (2010).

Romero et al., "Quantum autoencoders for efficient compression of quantum data", arXiv:1612.02806v2, Feb. 10, 2017, 11 pages. . . [retrieved on Jan. 20, 2020]. Retrieved from <https://arxiv.org/abs/1612.02806>.

Romero, J., and Aspuru-Guzik, A., "Variational quantum generators: Generative adversarial quantum machine learning for continuous distributions", Quantum Physics, arXiv:1901.00848 [quant-ph], pp. 1-15 (Jan. 3, 2019).

Romero, J., et al., "Quantum autoencoders for efficient compression of quantum data", Quantum Science and Technology, vol. 2 (4):045001, Feb. 10, 2017, pp. 1-10.

Romero, J., et al., "Strategies for quantum computing molecular energies using the unitary coupled cluster ansatz", arXiv:1701.02691v2 [quant-ph], vol. 4, No. 4, pp. 1-18 (Feb. 10, 2018).

Rubin, N. C., et al., "Application of Fermionic Marginal Constraints to Hybrid Quantum Algorithms", New Journal of Physics, vol. 20, No. 5, 053020, pp. 1-21 (2018).

(56) References Cited

OTHER PUBLICATIONS

Rubin, N.C., "A Hybrid Classical/Quantum Approach for Large-Scale Studies of Quantum Systems with Density Matrix Embedding Theory", Quantum Physics, arXiv:1610.06910 [quant-ph], pp. 1-10, (2016).

Rusu, A. A., et al., "Meta-learning with latent embedding optimization," arXiv:1807.05960, pp. 1-17 (Mar. 26, 2019).

Sarma, S.D., et al., "Majorana Zero Modes and Topological Quantum Computation", arXiv: 1501.02813v2, pp. 1-16, May 14, 2015 (retrieved on Nov. 17, 2019). Retrieved from <https://arxiv.org/abs/1501.02813>.

Schlittgen, B., et al., "Low-Energy Effective Theories of Quantum Spin and Quantum Link Models", Physical Review D, vol. 63. No. 8, pp. 1-29 (Mar. 19, 2001).

Schuch, N. and Verstraete, F., "Computational Complexity of interacting electrons and fundamental limitations of Density Functional Theory", Nature Physics, DOI: 10.1038/NPHYS1370, pp. 732-735 (Aug. 23, 2009).

Schuld, M., et al., "Circuit-centric quantum classifiers", arXiv:1804.00633v1, pp. 1-17 (Apr. 2, 2018).

Seeley, J.T., et al., "The Bravyi-Kitaev transformation for quantum computation of electronic structure," The Journal of chemical physics, 137(22):224109, 2012. arXiv:1208.5986, pp. 1-38 (Aug. 29, 2012).

Sepiol, M.A., "A High-Fidelity Microwave Driven Two-Qubit Quantum Logic Gate in 43Ca+", pp. 1-197 (2016).

Sergeevich, A., et al., "Characterization of a Qubit Hamiltonian Using Adaptive Measurements in a Fixed Basis", arXiv:1102.3700v2, pp. 1-6 (Nov. 23, 2011).

Sim, S., et al., "Adaptive pruning-based optimization of parameterized quantum circuits," Quantum Science and Technology 10.1088/2058-9565/abe107 (2021) pp. 1-24, arXiv:2010.00629.

Skolik, A., et al., "Layerwise learning for quantum neural networks," arXiv:2006.14904, vol. 3, No. 5 pp. 1-11 (Jun. 26, 2020).

Somma, R. D., "Quantum eigenvalue estimation via time series analysis," New Journal of Physics, 21(12):123025, 2019. arXiv:1907.11748, pp. 1-10 (Sep. 4, 2020).

Somma, R. D., et al., "Spectral gap amplification," SIAM Journal on Computing, 42(2):593-610, 2013. arXiv:1110.2494, Mar. 30, 2012, 14 pages.

Steane, A., "Multiple Particle Interference and Quantum Error Correction", Proceedings of The Royal Society A, The royal Society, vol. 452, Issue. 1954, pp. 2551-2577 (Nov. 8, 1996).

Subasi, Y., et al., "Quantum algorithms for systems of linear equations inspired by adiabatic quantum computing," Physical review letters, vol. 122, No. 6, pp. 1-9 (Nov. 29, 2018).

Sunkin Sim et al., "Expressibility and Entangling Capability of Parameterized Quantum Circuits for Hybrid Quantum-Classical Algorithms", arXiv:1905.10876v1, May 25, 2019, 18 pages. Available online at <URL: https://arxiv.org/abs/1905.10876v1.pdf>.

Swarnadeep Majumder et al., "Real-time calibration with spectator qubits", npj Quantum Information, vol. 6, Retrieved from: <URL: https://www.nature.com/articles/s41534-020-0251-y>, Feb. 7, 2020, 9 pages.

Szabo, A. and Ostlund, N.S., "Modern quantum chemistry: introduction to advanced electronic structure theory," Courier Corporation, 2012. pp. 1-479 (2012).

Takeshita, T., et al., "Increasing the Representation Accuracy of Quantum Simulations of Chemistry without Extra Quantum Resources," Phys. Rev. X, vol. 10, No. 1, pp. 1-9 (Jan. 7, 2020).

Official Action mailed May 16, 2023, in Canadian patent application No. 3,157,270, 4 pages.

\* cited by examiner

PARAMETER INITIALIZATION ON QUANTUM COMPUTERS THROUGH DOMAIN DECOMPOSITION

FIELD OF INVENTION

The disclosed technology is directed to a system and method for initializing and optimizing a variational quantum circuit on a hybrid quantum-classical computer, comprising a set of gates and a set of initial parameters representing a model of a physical system.

BACKGROUND

Quantum computers promise to solve industry-critical problems which are otherwise unsolvable. Key application areas include chemistry and materials, bioscience and bioinformatics, logistics, and finance. Interest in quantum computing has recently surged, in part, due to advances in the performance of ready-to-use quantum computers.

A quantum computer can be used to calculate physical properties of molecules and chemical compounds. Some examples include the amount of heat released or absorbed during a chemical reaction, the rate at which a chemical reaction might occur, and the absorption spectrum of a molecule or chemical compound. Although such physical properties are commonly calculated on classical computers using ab initio quantum chemistry simulations, quantum computers hold the potential to enable these properties to be calculated more quickly and accurately.

Optimizing the parameters of a quantum circuit is a difficult problem, because of the presence of barren plateaus and the existence of multiple local minima. Local stationary points that are not minima can also exist and hinder convergence. There is a need for a system and method for initializing and optimizing a quantum circuit without the drawbacks of prior approaches.

SUMMARY

The present disclosure provides a system and method for initializing and optimizing a variational quantum circuit on a hybrid quantum-classical computer, wherein the variational quantum circuit comprises a set of gates and a set of initial parameters representing a model of a physical system.

In one aspect, a hybrid quantum-classical computer comprises classical computer elements working in combination with quantum computer elements. The classical computer elements generally include a processor, computer memory, and a set of computer instructions stored in the memory. In one aspect, the computer instructions may be stored in a non-transitory computer-readable medium. The quantum computer elements include a plurality of qubits and perform a method for generating a variational quantum circuit comprising a set of gates and a set of initial parameters representing a model of a physical system. The model of a physical system comprises a set of smaller contiguous subsystems which can be independently optimized. The method generates a set of quantum circuits having a set of circuit subcomponents with the same structure as the set of contiguous subsystems, and each of the set of quantum circuits is independently optimized to minimize a property of the corresponding subsystem. At least one entangling gate is introduced between at least two circuit subcomponents in the set of circuit subcomponents. Also, the optimization of the circuit subcomponents may be constrained to generate a state representing a fixed number of particles. The circuit structure may be truncated to reduce the circuit depth of the quantum circuit at least one circuit subcomponent.

For example, properties may include physical parameters such as the ground state energy of a molecule, and the method may use the model to calculate the ground state energy of the molecule. Alternatively, the method may use the model to map the absorption spectrum of the molecule. The physical properties of a molecule may be mapped using the Jordan-Wigner transformation and/or the Bravyi-Kitaev transformation. The physical system may comprise a fermionic system.

In one embodiment, the initial parameters of the circuit components may be set according to values obtained from a parameter library. Once the initial parameters are set, the circuit components of the quantum computer proceed to optimization, which is independent for each subcomponent of the system. The optimization method may also include the use of a variational quantum eigensolver (VQE).

In another embodiment, a hybrid quantum-classical computer includes a quantum computer comprising a plurality of qubits, and a classical computer including a processor, a non-transitory computer-readable medium, and computer instructions stored in the non-transitory computer-readable medium. The computer instructions, when executed by the processor, perform a method for generating, on the hybrid quantum-classical computer, a variational quantum circuit comprising a set of gates and a set of initial parameters representing a model of a physical system, the method comprising. The method for generating proceeds in four phases or steps.

In the first phase, on the classical computer, the model of the physical system is decomposed into a plurality of subsystems, where the model has an interconnection between at least two of the plurality of subsystems.

In the second phase, on the classical computer, a description of the variational quantum circuit is generated. The variational quantum circuit includes a plurality of circuit subcomponents each having a corresponding set of initial subcomponent parameters. Each of the plurality of circuit subcomponents represents a corresponding one of the plurality of subsystems of the model of the physical system. The method may, after the second phase and before the third phase, truncate the depth of the quantum circuit for at least one circuit subcomponent.

The third phase is the tuning phase. On the quantum computer, each of the corresponding sets of initial subcomponent parameters are tuned to generate a target state of the corresponding one of the plurality of subsystems. The target state of the corresponding subsystem may be an approximate target state. The target state of the corresponding subsystem may be a minimum of a cost function of the physical system. The cost function of the physical system may be the ground state energy of the physical system.

In the fourth phase of the embodiment, a set of entangling gates is introduced into the description of the variational quantum circuit for each interconnection of two circuit subcomponents, which corresponding subsystems are interconnected in the model of the physical system.

The model of the physical subsystem may be a model of a molecule. The method may use the model to calculate a ground state energy of the molecule. The method may use the model to map the absorption spectrum of the molecule. The method may map the physical properties of the molecule using the Jordan-Wigner transformation. The method may map the physical properties of the molecule using the Bravyi-Kitaev transformation.

The target state may be a minimum of a cost function of the physical system. The minimum of the cost function of the physical system may be a ground state energy of the physical system. The tuning may include setting each of the corresponding sets of initial subcomponent parameters according to a parameter library. The tuning may include executing an optimization on a quantum computer. The optimization may be a variational quantum eigensolver (VQE).

In another embodiment of the technology, a method is provided for optimizing the initial parameters of a quantum circuit comprising a set of gates and a set of initial parameters representing a model of a physical system. The method comprises dividing a physical system into sets of smaller contiguous subsystems which can be independently optimized. A quantum circuit is generated, the quantum circuit having a set of circuit subcomponents with the same structure as the set of contiguous subsystems. The set of circuit subcomponents is optimized to minimize a property of the corresponding subsystem.

BRIEF DESCRIPTION OF THE DRAWINGS

The drawings presented are not necessarily to scale, with an emphasis instead generally being placed upon illustrating the principles of the technology disclosed. In the following description, various implementations of the technology disclosed are described with reference to the following drawings.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Embodiments of the present invention include a system and corresponding initialization method, which can be implemented on a quantum computer or hybrid quantum-classical computer, and which performs optimizations on small, easily tractable parts of the whole system. An advantage of such embodiments is that they may be performed on any ansatz, i.e., on any quantum circuit, even those that are not directly related to classical quantum chemistry concepts or that are non-trivial to simulate or understand.

In some embodiments, the system comprises a hybrid quantum-classical computer combining elements of a quantum computer and a classical computer. The quantum computer includes a plurality of qubits, and the classical computer includes a processor, a non-transitory computer-readable medium, and computer instructions stored in the non-transitory computer-readable medium. The computer instructions, when executed by the processor, perform a method for generating, on the hybrid quantum-classical computer, a variational quantum circuit comprising a set of gates and a set of initial parameters representing a model of a physical system, the model comprising a set of smaller contiguous subsystems which can be independently optimized.

Figure 4:
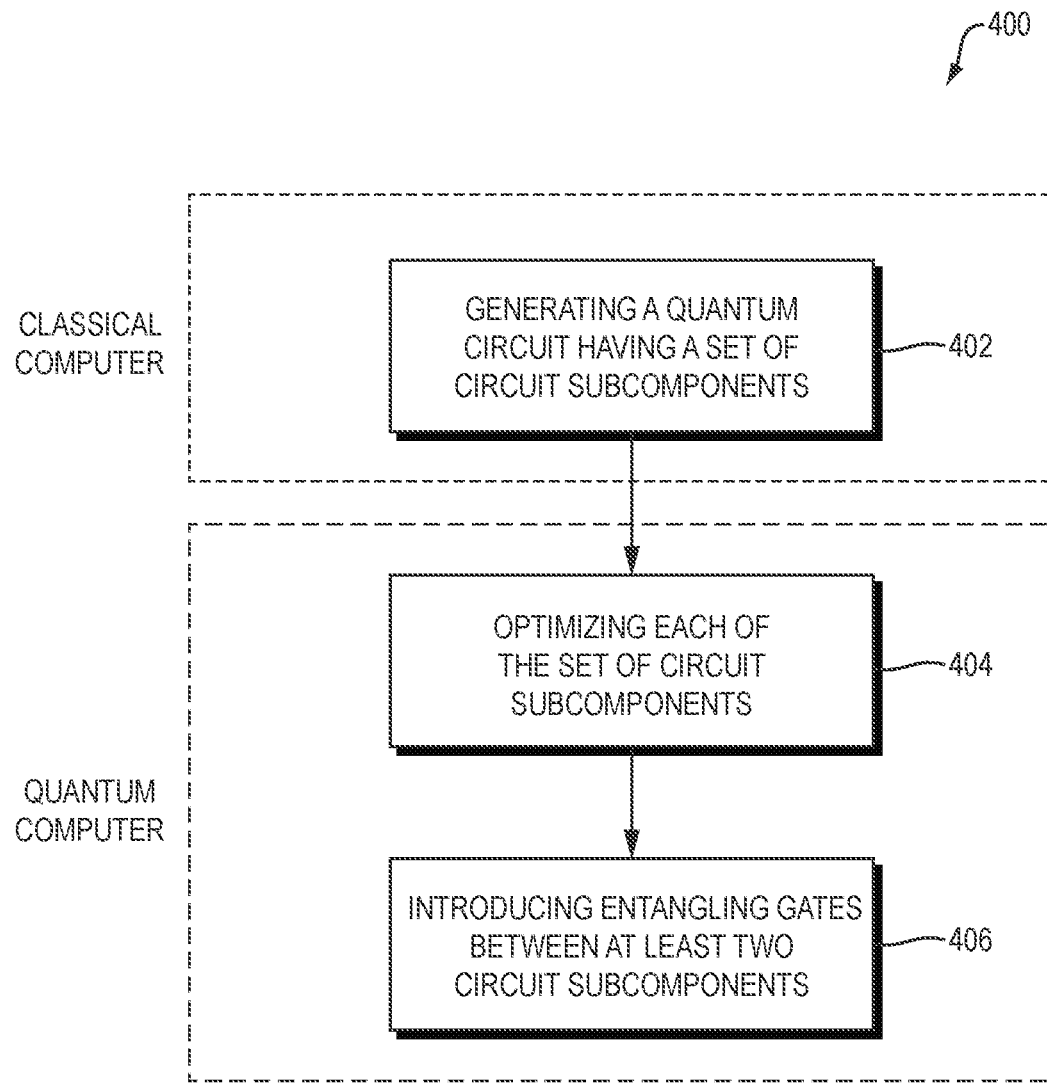
FIG. 4 is a flowchart of the process flow of one embodiment of the present invention, showing the method of initialization of a quantum circuit according to an embodiment of the present invention.

One embodiment of the method is illustrated in flowchart form in FIG. 4. The method 400 comprises generating 402 a quantum circuit having a set of circuit subcomponents with the same structure as the set of contiguous subsystems, optimizing 404 each of the set of circuit subcomponents to minimize a property of the corresponding subsystem, and introducing 406 at least one entangling gate between at least two circuit subcomponents.

A second optimization can optionally be performed over the entire quantum circuit to further optimize the energy of the quantum circuit.

Depending on the physical system, the first or the second optimization may be omitted if only a single step is sufficient to obtain a good enough initial approximation to the desired wavefunction. Each of these steps may include intermediate optimization procedures whose initialization will be described in detail. To further describe the optimization procedures, consider the following example where the physical system is a fermionic system and the property of the subsystem being computed is the energy.

Parameter Initialization Through Domain Decomposition

In the first step, embodiments of the present invention may divide the fermionic system of interest into smaller subsystems that are easier to optimize. For example, in a molecular or materials simulation, these subsystems may correspond to individual atoms and/or to small groups of atoms. The Hamiltonian of each subsystem may include the component of the parent system's Hamiltonian that involves interactions between the spin orbitals of the subsystem. The Hamiltonian may also include an approximate treatment of interactions with spin orbitals that belong to other subsystems. For example, if the canonical basis is used, embodiments of the present invention may account for interactions with other subsystems by assuming their spin orbitals to have the occupancy found in the Hartree-Fock state.

Embodiments of the present invention may also divide the quantum circuit to be optimized between the subsystems by ensuring that qubits representing spin-orbitals on a same subsystem are contiguous. Any gate from the original quantum circuit that couples qubits from different subsystems may be deleted in order to obtain independent quantum circuits.

Further embodiments of the present invention may eliminate duplicated quantum circuits that have the same gate structures and act on identical subsystems. Then, embodiments of the present invention may optimize each quantum circuit to minimize the energy of the corresponding subsystem. Since the size of the subsystem is much reduced compared to the original problem, this may be done by brute force optimization, trying enough random guesses until the final energy stops improving. Alternatively, this may be done by using any available global optimizer, local optimizer, meta-learning technique or combination thereof, since the optimization may be performed on a classical computer. In some cases, convergence may be verified by comparison with classical exact or highly accurate results. The quantum circuits for each subsystem may be constructed to fix the number of particles in each subsystem. Alternatively, a constrained optimization may be used to fix the number of particles in each subsystem.

In addition, the depth of the quantum circuit for each subsystem may be reduced by truncating the quantum circuit. The chosen optimization technique may be performed on the low-depth variant, and the truncated parts of the quantum circuit may be added back progressively until the energy of the system converges, such as by following a similar strategy to ADAPT-VQE.

This optimization may be performed only once for each subsystem for a given ansatz. The converged parameters and final structures of the quantum circuit may then be stored to be used as initialization for future computations using the same ansatz and subsystems.

The initial guess for the whole system may then obtained by assembling all subsystems and their optimized quantum circuits so that the whole system's quantum circuit is reproduced. The quantum gates that couple different subsystems together are initialized to the identity if possible. If this may not be achieved, the coupling gates may be appended at the end of the subsystem circuits and optimized one layer at a time.

Parameter Initialization from a Reference N-Excited State

The second step may be used to obtain an initial guess for the subsystem circuits from parameter initialization through domain decomposition, or for the full quantum circuit of the whole system. The second step relies on some pre-existing knowledge about the wavefunction of interest. Specifically, it aims to build a set of excited configurations from a reference configuration. Here, a reference configuration has a set of qubits in the $|1\rangle$ state and the other qubits in the $|0\rangle$ state and may be represented by a single bitstring. An n-excited configuration flips n qubits from the $|1\rangle$ to the $|0\rangle$ state and the same number of qubits from the $|0\rangle$ to the $|1\rangle$ state. A particle-attached (or particle-detached) configuration simply flips one or more qubits from $|0\rangle$ to $|1\rangle$ (or $|1\rangle$ to $|0\rangle$). If particle-attached or particle-detached configurations are needed, the same formalism as the one exposed below for excited configurations is applicable to them.

Reference and excited configurations are useful when a single bitstring (or a few bitstrings) are expected to dominate the composition of the wavefunction. This occurs in much of quantum chemistry, where doubly excited configurations from the reference are usually the most important contributions after the reference itself. Thus, building a superposition of double excitations with the reference as an initial guess is expected to give reasonable results. In other cases, other families of excitations may be more important. The following description is kept general to obtain n-excitations.

1. First, embodiments of the present invention may cut, from the circuit of interest, a block containing 2n contiguous qubits. All gates entangling these 2n qubits with other qubits are deleted. This circuit constitutes the guess quantum circuit.
2. Embodiments of the present invention may then choose a target state comprising a superposition of the reference configuration for the 2n qubits, and the desired n-excited configuration with pre-determined coefficients. Embodiments of the present invention may also choose several target states that to use for initialization, for example, target states transferring various amount of population from the reference to the n-excited configuration, i.e., with a range of different coefficients for the excited configuration between 0 and 1. The procedure below may be performed for each target state individually to obtain the required components of the initialization.
3. Embodiments of the present invention may then optimize the parameters of the guess quantum circuit on 2n qubits by maximizing the overlap between the chosen target state and the state produced by the quantum circuit on 2n qubits.
4. Initial parameters for the optimization in Step 3 may be chosen randomly, which usually requires trying several sets of random initial parameters for convergence. When possible, it may be advantageous to use a small model of the original problem that preserves the same importance ranking for families of excitations. For example, in the case of quantum chemistry, $H_2$ in 4 qubits is a small model that preserves the importance of double excitations found in other molecules. Optimization of the small problem may be relatively easy and provide reasonable initial parameters for the maximization of the guess quantum circuit overlaps with the various target states.
5. In case the desired target state cannot be reached, the depth of the guess quantum circuit may be increased by repeating all or part of the existing sequence of gates.
6. When optimizing for target states with the coefficient of the n-excited configuration varied between 0 and 1, embodiments of the present invention may then obtain a map associating parameter vectors with the quantum state they generate on the guess quantum circuit. When the parameter vectors' components vary smoothly as a function of the n-excited configuration's coefficients, embodiments of the present invention may be able to interpolate between parameter vectors using known methods. This way, embodiments of the present invention may obtain parameter vectors for arbitrary coefficients of the n-excited configuration.

The product of the above procedure is thus a set of parameter vectors associated with specific values of the coefficient for the n-excited configuration in superposition with the reference configuration. Each parameter vector also corresponds to a guess quantum circuit on 2n qubits.

If the domain decomposition approach described above is being used, then the desired initialization of the parent circuit of interest may be obtained by combining guess quantum circuits for each subsystem to generate a superposition of n-excited states as described below.

Even Superposition of N-Excited States

Figure 5:
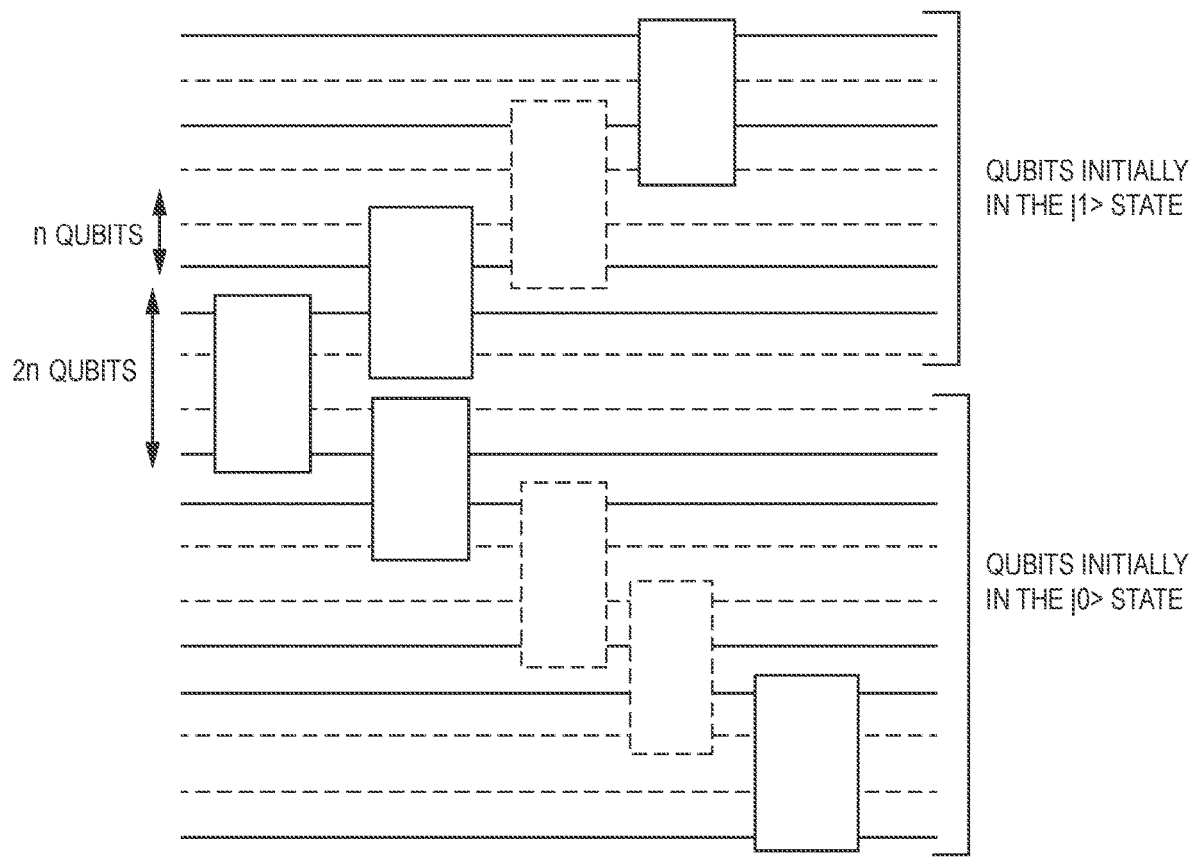
FIG. 5 illustrates a circuit structure to generate an even superposition of coupled n-excitations. The guess circuits on 2n qubits are represented by boxes organized in a staircase pattern, where each circuit overlaps with n qubits of the previous one.

In the case where an even superposition of coupled n-excited states is desired, this may be achieved by assembling the guess circuits as illustrated in FIG. 5. Coupled n-excitation here means that contiguous qubits are excited together into other contiguous qubits, and excitations that would change this ordering are neglected.

The structure presented on FIG. 5 assumes that the first $N_{occ}$ qubits are in the $|1\rangle$ state whereas the next $N_{vir}$ qubits are in the $|0\rangle$ state. Each guess (rectangular) circuit block extends over 2n qubits and generates a specific n-excitation over these qubits. The first block is placed on the reference configuration so that the first n qubits in the block are in the $|1\rangle$ state and the next n qubits are in the $|0\rangle$ state. The next blocks extend in a "staircase" pattern, where each block is shifted by n qubits with respect to the previous one towards further qubits in either the $|0\rangle$ or $|1\rangle$ state in the reference, until all qubits are covered. The parameters of the first guess circuit on the left of FIG. 5 are chosen based on the desired coefficient for the reference configuration in the target initial state. In quantum chemistry, a value close to 0.95 is often reasonable. Steps 1-6 have provided the parameters yielding the desired coefficient, and several different coefficients could be explored.

Each further circuit block should transfer the appropriate amount of excited population to n-excited configurations that involve qubits further and further from those included in the leftmost guess quantum circuit. To obtain an even superposition of n-excited states, the amount of population that should be transferred is given by a simple formula:

$$p_i^{occ} = \frac{(N_{occ}/n) - i - 1}{(N_{occ}/n) - i}$$

for the staircase pattern applied on qubits in the $|1\rangle$ state, where i labels each guess circuit from left to right in this pattern only, starting from 0, and excluding the first guess quantum circuit that overlaps with qubits in the $|1\rangle$ and $|0\rangle$ states in the reference configuration. For the staircase pattern into the qubits in the $|0\rangle$ state in the reference, the formula is similar:

$$p_i^{vir} = \frac{(N_{vir}/n) - j - 1}{(N_{vir}/n) - j}$$

where j labels each guess circuit from left to right in the $|0\rangle$ staircase pattern only, excluding the first guess circuit that overlaps with qubits initially in the $|0\rangle$ and the $|1\rangle$ states in the reference configuration. Once the amount of population transfer for each circuit block is known, the corresponding parameters can be found from the procedure in 1-6.

General Initialization

Instead of an even superposition of n-excited states, the weight of each state may be taken from some approximate classical computations or from some other source. For example, in the case of doubly excited states for quantum chemistry, MP2 or CCSD computations yield amplitudes that correspond to the coefficient of each desired doubly excited configuration.

The desired superposition of n-excited states may be built by considering separately each n-excited configuration and its associated coefficient. For each such configuration, we may use a (fermionic or not) swap network to make the desired n $|1\rangle$ qubits and n $|0\rangle$ qubits contiguous so that the application of the guess circuit results in the desired n-excited configuration with the corresponding coefficient, using again the knowledge gained from steps 1-6.

Repeating this procedure for each n-excited configuration occurring in the desired state will produce the corresponding initialization in the target quantum circuit. After this initial state is prepared, the chosen circuit ansatz may be applied and optimized.

The methods above may work on any qubit connectivity and with any native gate on a given device.

One aspect of the present invention is directed to a hybrid quantum-classical computer system. The hybrid quantum-classical computer system comprises: a quantum computer comprising a plurality of qubits; and a classical computer including a processor, a non-transitory computer-readable medium, and computer instructions stored in the non-transitory computer-readable medium. The computer instructions, when executed by the processor, perform a method for generating, on the hybrid quantum-classical computer, a variational quantum circuit comprising a set of gates and a set of initial parameters representing a model of a physical system. The model comprises a set of smaller contiguous subsystems which can be independently optimized. The method includes: generating a set of quantum circuits having a set of circuit subcomponents with the same structure as the set of contiguous subsystems; optimizing each of the set of quantum circuits to minimize a property of the corresponding subsystem; and introducing at least one entangling gate between at least two circuit subcomponents in the set of circuit subcomponents.

The physical system may be a fermionic system. Optimizing the set of circuit subcomponents may include constraining each of circuit subcomponents in the set of circuit subcomponents to generate a state representing a fixed number of particles. The property of the corresponding subsystem may be a ground state energy of the corresponding subsystem. The method may further include truncating a depth of the quantum circuit for at least one circuit subcomponent.

The physical system may be or include a molecule. The method may further include using the model to calculate a ground state energy of the molecule. The method may further include using the model to map the absorption spectrum of the molecule. The method may further include mapping physical properties of the molecule using the Jordan-Wigner transformation. The method may further include mapping physical properties of the molecule using the Bravyi-Kitaev transformation.

The method may further include tuning initial parameters of the circuit subcomponents in the set of circuit subcomponents by setting values of the initial parameters according to a parameter library.

The method may further include tuning initial parameters of the circuit subcomponents in the set of circuit subcomponents by executing an optimization on the quantum computer. The optimization may include comprises a variational quantum eigensolver (VQE).

The method may further include optimizing the at least one entangling gate to minimize a global property of the system. The global property of the system may be the same property as the property of the corresponding subsystems.

Optimizing each of the set of quantum circuits may include tuning, on the quantum computer, a set of subcomponent parameters to generate a target state. Generating the set of quantum circuits may include truncating the depth of the quantum circuit for at least one circuit subcomponent. The target state may be an approximate target state. The target state may be a minimum of a cost function of the physical system. The minimum of the cost function of the physical system may be the ground state energy of the physical system. The tuning of the set of subcomponent parameters may include setting each of the corresponding sets of subcomponent parameters according to a parameter library.

The method may further include decomposing, on the classical computer, the model of the physical system into the set of smaller contiguous subsystems.

Another aspect of the present invention is directed to a hybrid quantum-classical computer system comprising: a quantum computer comprising a plurality of qubits; and a classical computer including a processor, a non-transitory computer-readable medium, and computer instructions stored in the non-transitory computer-readable medium. The computer instructions, when executed by the processor, perform a method for generating, on the hybrid quantum-classical computer, a variational quantum circuit comprising a set of gates and a set of initial parameters representing a model of a physical system. The method includes: (a) decomposing, on the classical computer, the model of the physical system into a plurality of subsystems, the model having an interconnection between at least two of the plurality of subsystems; (b) generating, on the classical computer, a description of the variational quantum circuit, the variational quantum circuit including a plurality of circuit subcomponents each having a corresponding set of initial subcomponent parameters, wherein each of the plurality of circuit subcomponents represents a corresponding one of the plurality of subsystems of the model of the physical system; (c) tuning, on the quantum computer, each of the corresponding sets of initial subcomponent parameters to generate a target state of the corresponding one of the plurality of subsystems; and (d) introducing into the description of the variational quantum circuit a set of entangling gates for each interconnection, connecting two circuit subcomponents whose corresponding subsystems are interconnected in the model of the physical system.

The method may further include, after the generating and before the tuning steps, truncating the depth of the quantum circuit for at least one circuit subcomponent. The target state of the corresponding subsystem may be an approximate target state. The model of the physical system may be a model of a molecule. The target state may be a minimum of a cost function of the physical system. The minimum of the cost function of the physical system may be the ground state energy of the physical system. The tuning of the initial subcomponent parameters may be performed by setting each of the corresponding sets of initial subcomponent parameters according to a parameter library.

The tuning of the initial subcomponent parameters may be performed by executing an optimization on a quantum computer. The optimization may be a variational quantum eigensolver (VQE). The target state of the corresponding subsystem may be an approximate target state.

The method may further include optimizing the at least one entangling gate to minimize a global property of the system. The global property of the system may be the same property as the property of the corresponding subsystems.

Optimizing each of the set of quantum circuits may include tuning, on the quantum computer, a set of subcomponent parameters to generate a target state. Generating the set of quantum circuits may include truncating the depth of the quantum circuit for at least one circuit subcomponent. The target state may be an approximate target state. The target state may be a minimum of a cost function of the physical system. The minimum of the cost function of the physical system may be the ground state energy of the physical system. The tuning of the set of subcomponent parameters may include setting each of the corresponding sets of subcomponent parameters according to a parameter library.

The method may further include decomposing, on the classical computer, the model of the physical system into the set of smaller contiguous subsystems.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Various physical embodiments of a quantum computer are suitable for use according to the present disclosure. In general, the fundamental data storage unit in quantum computing is the quantum bit, or qubit. The qubit is a quantum-computing analog of a classical digital computer system bit. A classical bit is considered to occupy, at any given point in time, one of two possible states corresponding to the binary digits (bits) 0 or 1. By contrast, a qubit is implemented in hardware by a physical medium with quantum-mechanical characteristics. Such a medium, which physically instantiates a qubit, may be referred to herein as a "physical instantiation of a qubit," a "physical embodiment of a qubit," a "medium embodying a qubit," or similar terms, or simply as a "qubit," for ease of explanation. It should be understood, therefore, that references herein to "qubits" within descriptions of embodiments of the present invention refer to physical media which embody qubits.

Each qubit has an infinite number of different potential quantum-mechanical states. When the state of a qubit is physically measured, the measurement produces one of two different basis states resolved from the state of the qubit. Thus, a single qubit can represent a one, a zero, or any quantum superposition of those two qubit states; a pair of qubits can be in any quantum superposition of 4 orthogonal basis states; and three qubits can be in any superposition of 8 orthogonal basis states. The function that defines the quantum-mechanical states of a qubit is known as its wavefunction. The wavefunction also specifies the probability distribution of outcomes for a given measurement. A qubit, which has a quantum state of dimension two (i.e., has two orthogonal basis states), may be generalized to a d-dimensional "qudit," where d may be any integral value, such as 2, 3, 4, or higher. In the general case of a qudit, measurement of the qudit produces one of d different basis states resolved from the state of the qudit. Any reference herein to a qubit should be understood to refer more generally to a d-dimensional qudit with any value of d.

Although certain descriptions of qubits herein may describe such qubits in terms of their mathematical properties, each such qubit may be implemented in a physical medium in any of a variety of different ways. Examples of such physical media include superconducting material, trapped ions, photons, optical cavities, individual electrons trapped within quantum dots, point defects in solids (e.g., phosphorus donors in silicon or nitrogen-vacancy centers in diamond), molecules (e.g., alanine, vanadium complexes), or aggregations of any of the foregoing that exhibit qubit behavior, that is, comprising quantum states and transitions therebetween that can be controllably induced or detected.

For any given medium that implements a qubit, any of a variety of properties of that medium may be chosen to implement the qubit. For example, if electrons are chosen to implement qubits, then the x component of its spin degree of freedom may be chosen as the property of such electrons to represent the states of such qubits. Alternatively, the y component, or the z component of the spin degree of freedom may be chosen as the property of such electrons to represent the state of such qubits. This is merely a specific example of the general feature that for any physical medium that is chosen to implement qubits, there may be multiple physical degrees of freedom (e.g., the x, y, and z components in the electron spin example) that may be chosen to represent 0 and 1. For any particular degree of freedom, the physical medium may controllably be put in a state of superposition, and measurements may then be taken in the chosen degree of freedom to obtain readouts of qubit values.

Certain implementations of quantum computers, referred to as gate model quantum computers, comprise quantum gates. In contrast to classical gates, there is an infinite number of possible single-qubit quantum gates that change the state vector of a qubit. Changing the state of a qubit state vector typically is referred to as a single-qubit rotation, and may also be referred to herein as a state change or a single-qubit quantum-gate operation. A rotation, state change, or single-qubit quantum-gate operation may be represented mathematically by a unitary 2×2 matrix with complex elements. A rotation corresponds to a rotation of a qubit state within its Hilbert space, which may be conceptualized as a rotation of the Bloch sphere. (As is well-known to those having ordinary skill in the art, the Bloch sphere is a geometrical representation of the space of pure states of a qubit.) Multi-qubit gates alter the quantum state of a set of qubits. For example, two-qubit gates rotate the state of two qubits as a rotation in the four-dimensional Hilbert space of the two qubits. (As is well-known to those having ordinary skill in the art, a Hilbert space is an abstract vector space possessing the structure of an inner product that allows length and angle to be measured. Furthermore, Hilbert spaces are complete: there are enough limits in the space to allow the techniques of calculus to be used.)

A quantum circuit may be specified as a sequence of quantum gates. As described in more detail below, the term "quantum gate," as used herein, refers to the application of a gate control signal (defined below) to one or more qubits to cause those qubits to undergo certain physical transformations and thereby to implement a logical gate operation. To conceptualize a quantum circuit, the matrices corresponding to the component quantum gates may be multiplied together in the order specified by the gate sequence to produce a 2n×2n complex matrix representing the same overall state change on n qubits. A quantum circuit may thus be expressed as a single resultant operator. However, designing a quantum circuit in terms of constituent gates allows the design to conform to a standard set of gates, and thus enable greater ease of deployment. A quantum circuit thus corresponds to a design for actions taken upon the physical components of a quantum computer.

A given variational quantum circuit may be parameterized in a suitable device-specific manner. More generally, the quantum gates making up a quantum circuit may have an associated plurality of tuning parameters. For example, in embodiments based on optical switching, tuning parameters may correspond to the angles of individual optical elements.

In certain embodiments of quantum circuits, the quantum circuit includes both one or more gates and one or more measurement operations. Quantum computers implemented using such quantum circuits are referred to herein as implementing "measurement feedback." For example, a quantum computer implementing measurement feedback may execute the gates in a quantum circuit and then measure only a subset (i.e., fewer than all) of the qubits in the quantum computer, and then decide which gate(s) to execute next based on the outcome(s) of the measurement(s). In particular, the measurement(s) may indicate a degree of error in the gate operation(s), and the quantum computer may decide which gate(s) to execute next based on the degree of error. The quantum computer may then execute the gate(s) indicated by the decision. This process of executing gates, measuring a subset of the qubits, and then deciding which gate(s) to execute next may be repeated any number of times. Measurement feedback may be useful for performing quantum error correction, but is not limited to use in performing quantum error correction. For every quantum circuit, there is an error-corrected implementation of the circuit with or without measurement feedback.

Some embodiments described herein generate, measure, or utilize quantum states that approximate a target quantum state (e.g., a ground state of a Hamiltonian). As will be appreciated by those trained in the art, there are many ways to quantify how well a first quantum state "approximates" a second quantum state. In the following description, any concept or definition of approximation known in the art may be used without departing from the scope hereof. For example, when the first and second quantum states are represented as first and second vectors, respectively, the first quantum state approximates the second quantum state when an inner product between the first and second vectors (called the "fidelity" between the two quantum states) is greater than a predefined amount (typically labeled E). In this example, the fidelity quantifies how "close" or "similar" the first and second quantum states are to each other. The fidelity represents a probability that a measurement of the first quantum state will give the same result as if the measurement were performed on the second quantum state. Proximity between quantum states can also be quantified with a distance measure, such as a Euclidean norm, a Hamming distance, or another type of norm known in the art. Proximity between quantum states can also be defined in computational terms. For example, the first quantum state approximates the second quantum state when a polynomial time-sampling of the first quantum state gives some desired information or property that it shares with the second quantum state.

Not all quantum computers are gate model quantum computers. Embodiments of the present invention are not limited to being implemented using gate model quantum computers. As an alternative example, embodiments of the present invention may be implemented, in whole or in part, using a quantum computer that is implemented using a quantum annealing architecture, which is an alternative to the gate model quantum computing architecture. More specifically, quantum annealing (QA) is a metaheuristic for finding the global minimum of a given objective function over a given set of candidate solutions (candidate states), by a process using quantum fluctuations.

Figure 2A:
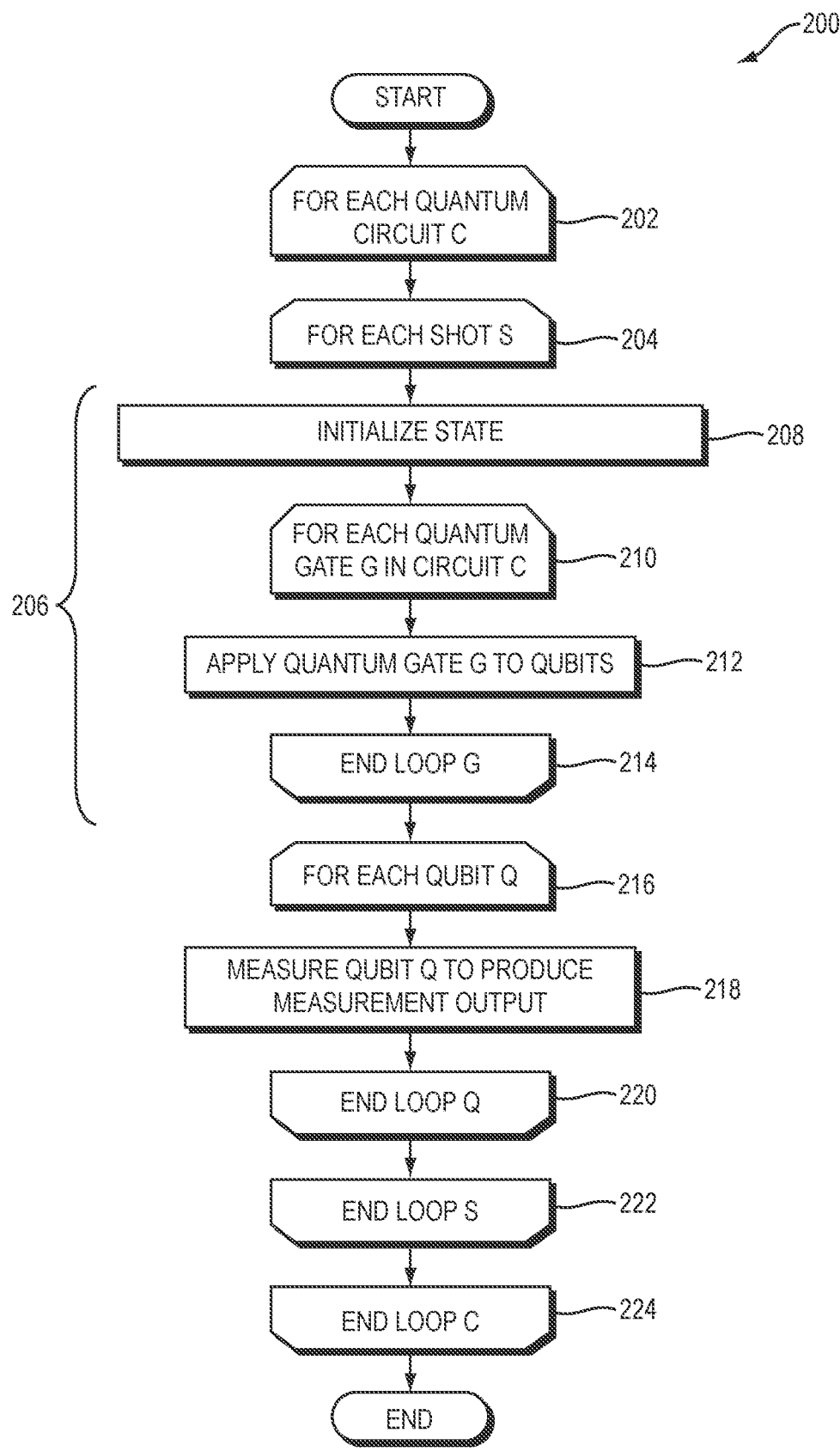
FIG. 2A is a flowchart of a method performed by the quantum computer of FIG. 1 according to one embodiment of the present invention.
Figure 2B:
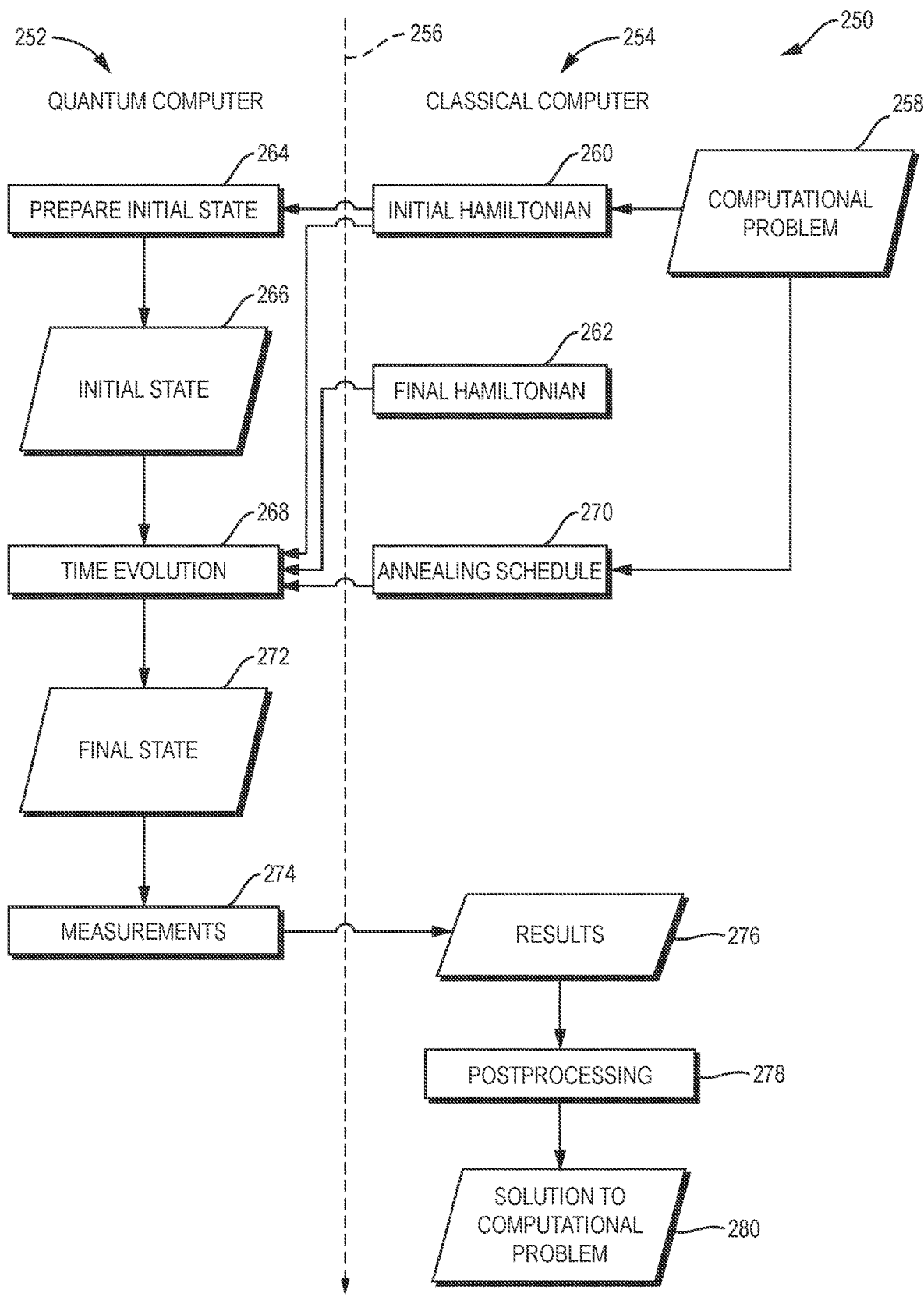
FIG. 2B is a diagram of a hybrid quantum-classical computer which performs quantum annealing according to one embodiment of the present invention.

FIG. 2B shows a diagram illustrating operations typically performed by a computer system 250 which implements quantum annealing. The system 250 includes both a quantum computer 252 and a classical computer 254. Operations shown on the left of the dashed vertical line 256 typically are performed by the quantum computer 252, while operations shown on the right of the dashed vertical line 256 typically are performed by the classical computer 254.

Quantum annealing starts with the classical computer 254 generating an initial Hamiltonian 260 and a final Hamiltonian 262 based on a computational problem 258 to be solved, and providing the initial Hamiltonian 260, the final Hamiltonian 262 and an annealing schedule 270 as input to the quantum computer 252. The quantum computer 252 prepares a well-known initial state 266 (FIG. 2B, operation 264), such as a quantum-mechanical superposition of all possible states (candidate states) with equal weights, based on the initial Hamiltonian 260. The classical computer 254 provides the initial Hamiltonian 260, a final Hamiltonian 262, and an annealing schedule 270 to the quantum computer 252. The quantum computer 252 starts in the initial state 266, and evolves its state according to the annealing schedule 270 following the time-dependent Schrödinger equation, a natural quantum-mechanical evolution of physical systems (FIG. 2B, operation 268). More specifically, the state of the quantum computer 252 undergoes time evolution under a time-dependent Hamiltonian, which starts from the initial Hamiltonian 260 and terminates at the final Hamiltonian 262. If the rate of change of the system Hamiltonian is slow enough, the system stays close to the ground state of the instantaneous Hamiltonian. If the rate of change of the system Hamiltonian is accelerated, the system may leave the ground state temporarily but produce a higher likelihood of concluding in the ground state of the final problem Hamiltonian, i.e., diabatic quantum computation. At the end of the time evolution, the set of qubits on the quantum annealer is in a final state 272, which is expected to be close to the ground state of the classical Ising model that corresponds to the solution to the original optimization problem. An experimental demonstration of the success of quantum annealing for random magnets was reported immediately after the initial theoretical proposal.

The final state 272 of the quantum computer 252 is measured, thereby producing results 276 (i.e., measurements) (FIG. 2B, operation 274). The measurement operation 274 may be performed, for example, in any of the ways disclosed herein, such as in any of the ways disclosed herein in connection with the measurement unit 110 in FIG. 1. The classical computer 254 performs postprocessing on the measurement results 276 to produce output 280 representing a solution to the original computational problem 258 (FIG. 2B, operation 278).

As yet another alternative example, embodiments of the present invention may be implemented, in whole or in part, using a quantum computer that is implemented using a one-way quantum computing architecture, also referred to as a measurement-based quantum computing architecture, which is another alternative to the gate model quantum computing architecture. More specifically, the one-way or measurement based quantum computer (MBQC) is a method of quantum computing that first prepares an entangled resource state, usually a cluster state or graph state, then performs single qubit measurements on it. It is "one-way" because the resource state is destroyed by the measurements.

The outcome of each individual measurement is random, but they are related in such a way that the computation always succeeds. In general the choices of basis for later measurements need to depend on the results of earlier measurements, and hence the measurements cannot all be performed at the same time.

Any of the functions disclosed herein may be implemented using means for performing those functions. Such means include, but are not limited to, any of the components disclosed herein, such as the computer-related components described below.

Figure 1:
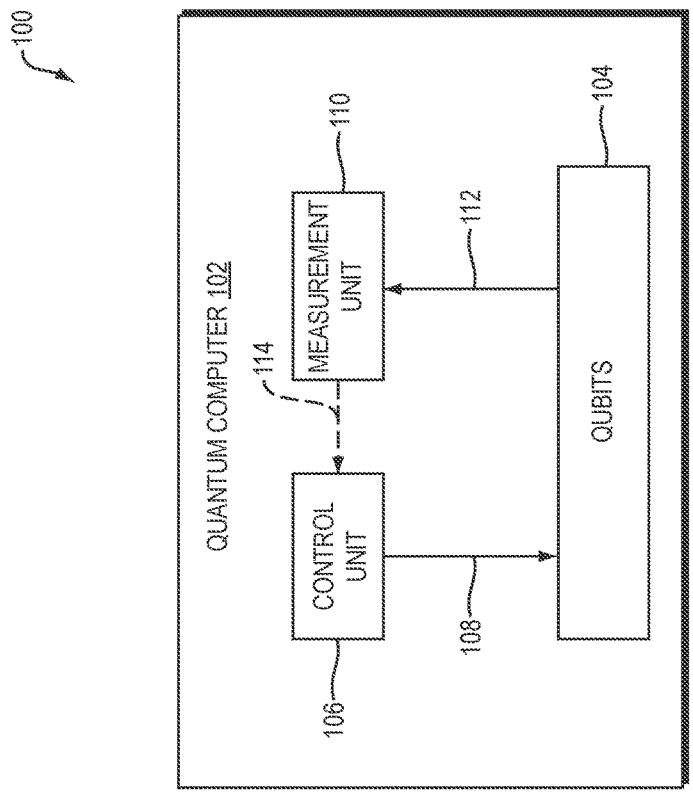
FIG. 1 is a diagram of a quantum computer according to one embodiment of the present invention.

Referring to FIG. 1, a diagram is shown of a system 100 implemented according to one embodiment of the present invention. Referring to FIG. 2A, a flowchart is shown of a method 200 performed by the system 100 of FIG. 1 according to one embodiment of the present invention. The system 100 includes a quantum computer 102. The quantum computer 102 includes a plurality of qubits 104, which may be implemented in any of the ways disclosed herein. There may be any number of qubits 104 in the quantum computer 102. For example, the qubits 104 may include or consist of no more than 2 qubits, no more than 4 qubits, no more than 8 qubits, no more than 16 qubits, no more than 32 qubits, no more than 64 qubits, no more than 128 qubits, no more than 256 qubits, no more than 512 qubits, no more than 1024 qubits, no more than 2048 qubits, no more than 4096 qubits, or no more than 8192 qubits. These are merely examples, in practice there may be any number of qubits 104 in the quantum computer 102.

There may be any number of gates in a quantum circuit. However, in some embodiments the number of gates may be at least proportional to the number of qubits 104 in the quantum computer 102. In some embodiments the gate depth may be no greater than the number of qubits 104 in the quantum computer 102, or no greater than some linear multiple of the number of qubits 104 in the quantum computer 102 (e.g., 2, 3, 4, 5, 6, or 7).

The qubits 104 may be interconnected in any graph pattern. For example, they be connected in a linear chain, a two-dimensional grid, an all-to-all connection, any combination thereof, or any subgraph of any of the preceding.

As will become clear from the description below, although element 102 is referred to herein as a "quantum computer," this does not imply that all components of the quantum computer 102 leverage quantum phenomena. One or more components of the quantum computer 102 may, for example, be classical (i.e., non-quantum components) components which do not leverage quantum phenomena.

The quantum computer 102 includes a control unit 106, which may include any of a variety of circuitry and/or other machinery for performing the functions disclosed herein. The control unit 106 may, for example, consist entirely of classical components. The control unit 106 generates and provides as output one or more control signals 108 to the qubits 104. The control signals 108 may take any of a variety of forms, such as any kind of electromagnetic signals, such as electrical signals, magnetic signals, optical signals (e.g., laser pulses), or any combination thereof.

For example:

In embodiments in which some or all of the qubits 104 are implemented as photons (also referred to as a "quantum optical" implementation) that travel along waveguides, the control unit 106 may be a beam splitter (e.g., a heater or a mirror), the control signals 108 may be signals that control the heater or the rotation of the mirror, the measurement unit 110 may be a photodetector, and the measurement signals 112 may be photons.

In embodiments in which some or all of the qubits 104 are implemented as charge type qubits (e.g., transmon, X-mon, G-mon) or flux-type qubits (e.g., flux qubits, capacitively shunted flux qubits) (also referred to as a "circuit quantum electrodynamic" (circuit QED) implementation), the control unit 106 may be a bus resonator activated by a drive, the control signals 108 may be cavity modes, the measurement unit 110 may be a second resonator (e.g., a low-Q resonator), and the measurement signals 112 may be voltages measured from the second resonator using dispersive readout techniques.

In embodiments in which some or all of the qubits 104 are implemented as superconducting circuits, the control unit 106 may be a circuit QED-assisted control unit or a direct capacitive coupling control unit or an inductive capacitive coupling control unit, the control signals 108 may be cavity modes, the measurement unit 110 may be a second resonator (e.g., a low-Q resonator), and the measurement signals 112 may be voltages measured from the second resonator using dispersive readout techniques.

In embodiments in which some or all of the qubits 104 are implemented as trapped ions (e.g., electronic states of, e.g., magnesium ions), the control unit 106 may be a laser, the control signals 108 may be laser pulses, the measurement unit 110 may be a laser and either a CCD or a photodetector (e.g., a photomultiplier tube), and the measurement signals 112 may be photons.

In embodiments in which some or all of the qubits 104 are implemented using nuclear magnetic resonance (NMR) (in which case the qubits may be molecules, e.g., in liquid or solid form), the control unit 106 may be a radio frequency (RF) antenna, the control signals 108 may be RF fields emitted by the RF antenna, the measurement unit 110 may be another RF antenna, and the measurement signals 112 may be RF fields measured by the second RF antenna.

In embodiments in which some or all of the qubits 104 are implemented as nitrogen-vacancy centers (NV centers), the control unit 106 may, for example, be a laser, a microwave antenna, or a coil, the control signals 108 may be visible light, a microwave signal, or a constant electromagnetic field, the measurement unit 110 may be a photodetector, and the measurement signals 112 may be photons.

In embodiments in which some or all of the qubits 104 are implemented as two-dimensional quasiparticles called "anyons" (also referred to as a "topological quantum computer" implementation), the control unit 106 may be nanowires, the control signals 108 may be local electrical fields or microwave pulses, the measurement unit 110 may be superconducting circuits, and the measurement signals 112 may be voltages.

In embodiments in which some or all of the qubits 104 are implemented as semiconducting material (e.g., nanowires), the control unit 106 may be microfabricated gates, the control signals 108 may be RF or microwave signals, the measurement unit 110 may be microfabricated gates, and the measurement signals 112 may be RF or microwave signals.

Although not shown explicitly in FIG. 1 and not required, the measurement unit 110 may provide one or more feedback signals 114 to the control unit 106 based on the measurement signals 112. For example, quantum computers referred to as "one-way quantum computers" or "measurement-based quantum computers" utilize such feedback signals 114 from the measurement unit 110 to the control unit 106. Such feedback signals 114 is also necessary for the operation of fault-tolerant quantum computing and error correction.

The control signals 108 may, for example, include one or more state preparation signals which, when received by the qubits 104, cause some or all of the qubits 104 to change their states. Such state preparation signals constitute a quantum circuit also referred to as an "ansatz circuit." The resulting state of the qubits 104 is referred to herein as an "initial state" or an "ansatz state." The process of outputting the state preparation signal(s) to cause the qubits 104 to be in their initial state is referred to herein as "state preparation" (FIG. 2A, section 206). A special case of state preparation is "initialization," also referred to as a "reset operation," in which the initial state is one in which some or all of the qubits 104 are in the "zero" state i.e. the default single-qubit state. More generally, state preparation may involve using the state preparation signals to cause some or all of the qubits 104 to be in any distribution of desired states. In some embodiments, the control unit 106 may first perform initialization on the qubits 104 and then perform preparation on the qubits 104, by first outputting a first set of state preparation signals to initialize the qubits 104, and by then outputting a second set of state preparation signals to put the qubits 104 partially or entirely into non-zero states.

Another example of control signals 108 that may be output by the control unit 106 and received by the qubits 104 are gate control signals. The control unit 106 may output such gate control signals, thereby applying one or more gates to the qubits 104. Applying a gate to one or more qubits causes the set of qubits to undergo a physical state change which embodies a corresponding logical gate operation (e.g., single-qubit rotation, two-qubit entangling gate or multi-qubit operation) specified by the received gate control signal. As this implies, in response to receiving the gate control signals, the qubits 104 undergo physical transformations which cause the qubits 104 to change state in such a way that the states of the qubits 104, when measured (see below), represent the results of performing logical gate operations specified by the gate control signals. The term "quantum gate," as used herein, refers to the application of a gate control signal to one or more qubits to cause those qubits to undergo the physical transformations described above and thereby to implement a logical gate operation.

It should be understood that the dividing line between state preparation (and the corresponding state preparation signals) and the application of gates (and the corresponding gate control signals) may be chosen arbitrarily. For example, some or all the components and operations that are illustrated in FIGS. 1 and 2A-2B as elements of "state preparation" may instead be characterized as elements of gate application. Conversely, for example, some or all of the components and operations that are illustrated in FIGS. 1 and 2A-2B as elements of "gate application" may instead be characterized as elements of state preparation. As one particular example, the system and method of FIGS. 1 and 2A-2B may be characterized as solely performing state preparation followed by measurement, without any gate application, where the elements that are described herein as being part of gate application are instead considered to be part of state preparation. Conversely, for example, the system and method of FIGS. 1 and 2A-2B may be characterized as solely performing gate application followed by measurement, without any state preparation, and where the elements that are described herein as being part of state preparation are instead considered to be part of gate application.

The quantum computer 102 also includes a measurement unit 110, which performs one or more measurement operations on the qubits 104 to read out measurement signals 112 (also referred to herein as "measurement results") from the qubits 104, where the measurement results 112 are signals representing the states of some or all of the qubits 104. In practice, the control unit 106 and the measurement unit 110 may be entirely distinct from each other, or contain some components in common with each other, or be implemented using a single unit (i.e., a single unit may implement both the control unit 106 and the measurement unit 110). For example, a laser unit may be used both to generate the control signals 108 and to provide stimulus (e.g., one or more laser beams) to the qubits 104 to cause the measurement signals 112 to be generated.

In general, the quantum computer 102 may perform various operations described above any number of times. For example, the control unit 106 may generate one or more control signals 108, thereby causing the qubits 104 to perform one or more quantum gate operations. The measurement unit 110 may then perform one or more measurement operations on the qubits 104 to read out a set of one or more measurement signals 112. The measurement unit 110 may repeat such measurement operations on the qubits 104 before the control unit 106 generates additional control signals 108, thereby causing the measurement unit 110 to read out additional measurement signals 112 resulting from the same gate operations that were performed before reading out the previous measurement signals 112. The measurement unit 110 may repeat this process any number of times to generate any number of measurement signals 112 corresponding to the same gate operations. The quantum computer 102 may then aggregate such multiple measurements of the same gate operations in any of a variety of ways.

After the measurement unit 110 has performed one or more measurement operations on the qubits 104 after they have performed one set of gate operations, the control unit 106 may generate one or more additional control signals 108, which may differ from the previous control signals 108, thereby causing the qubits 104 to perform one or more additional quantum gate operations, which may differ from the previous set of quantum gate operations. The process described above may then be repeated, with the measurement unit 110 performing one or more measurement operations on the qubits 104 in their new states (resulting from the most recently-performed gate operations).

In general, the system 100 may implement a plurality of quantum circuits as follows. For each quantum circuit C in the plurality of quantum circuits (FIG. 2A, operation 202), the system 100 performs a plurality of "shots" on the qubits 104. The meaning of a shot will become clear from the description that follows. For each shot S in the plurality of shots (FIG. 2A, operation 204), the system 100 prepares the state of the qubits 104 (FIG. 2A, section 206). More specifically, for each quantum gate G in quantum circuit C (FIG. 2A, operation 210), the system 100 applies quantum gate G to the qubits 104 (FIG. 2A, operations 212 and 214).

Then, for each of the qubits Q 104 (FIG. 2A, operation 216), the system 100 measures the qubit Q to produce measurement output representing a current state of qubit Q (FIG. 2A, operations 218 and 220).

The operations described above are repeated for each shot S (FIG. 2A, operation 222), and circuit C (FIG. 2A, operation 224). As the description above implies, a single "shot" involves preparing the state of the qubits 104 and applying all of the quantum gates in a circuit to the qubits 104 and then measuring the states of the qubits 104; and the system 100 may perform multiple shots for one or more circuits.

Figure 3:
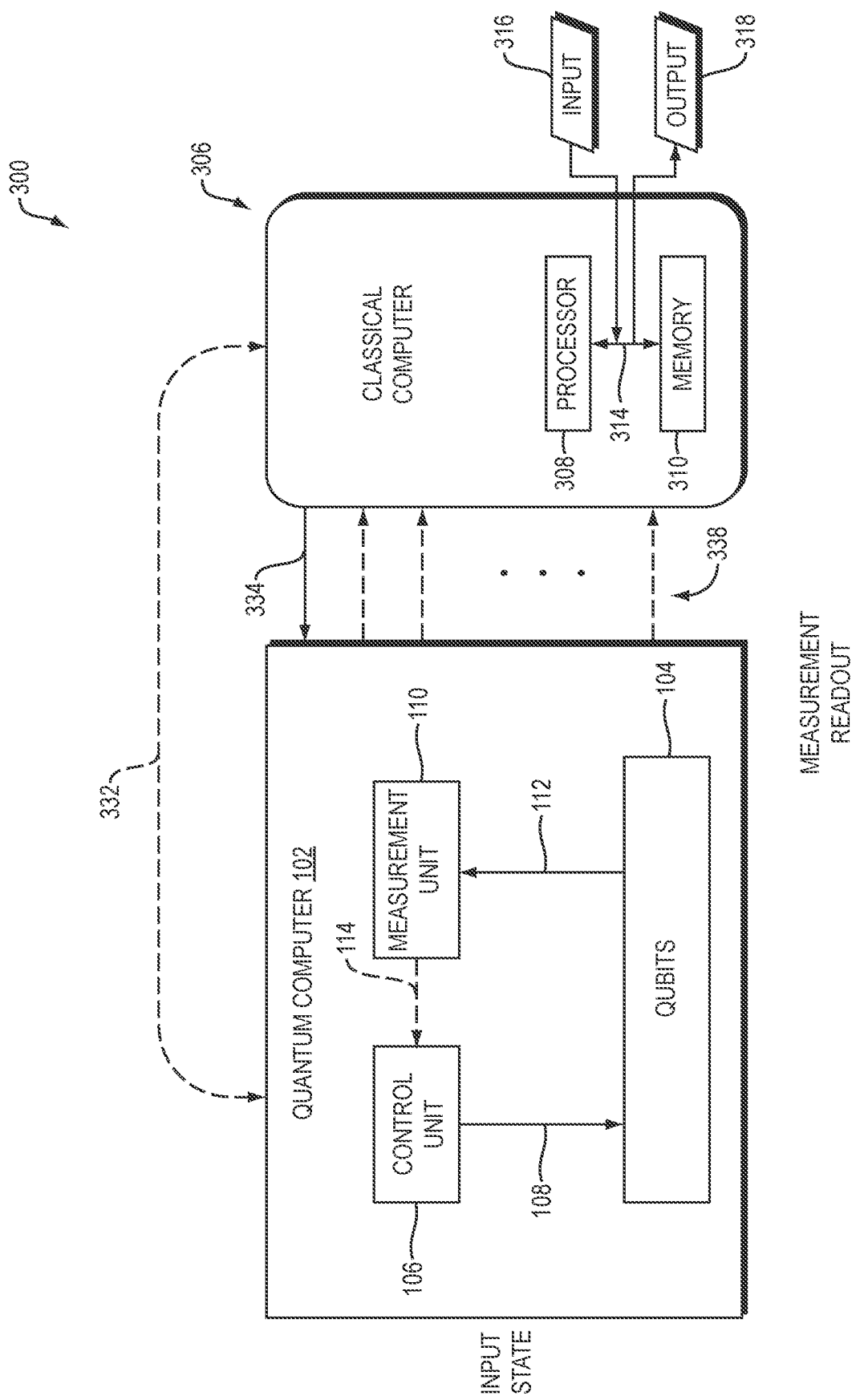
FIG. 3 is a diagram of a hybrid quantum-classical computer according to one embodiment of the present invention.

Referring to FIG. 3, a diagram is shown of a hybrid quantum-classical (HQC) computer 300 implemented according to one embodiment of the present invention. The HQC 300 includes a quantum computer component 102 (which may, for example, be implemented in the manner shown and described in connection with FIG. 1) and a classical computer component 306. The classical computer component may be a machine implemented according to the general computing model established by John Von Neumann, in which programs are written in the form of ordered lists of instructions and stored within a classical (e.g., digital) memory 310 and executed by a classical (e.g., digital) processor 308 of the classical computer. The memory 310 is classical in the sense that it stores data in a storage medium in the form of bits, which have a single definite binary state at any point in time. The bits stored in the memory 310 may, for example, represent a computer program. The classical computer component 304 typically includes a bus 314. The processor 308 may read bits from and write bits to the memory 310 over the bus 314. For example, the processor 308 may read instructions from the computer program in the memory 310, and may optionally receive input data 316 from a source external to the computer 302, such as from a user input device such as a mouse, keyboard, or any other input device. The processor 308 may use instructions that have been read from the memory 310 to perform computations on data read from the memory 310 and/or the input 316, and generate output from those instructions. The processor 308 may store that output back into the memory 310 and/or provide the output externally as output data 318 via an output device, such as a monitor, speaker, or network device.

The quantum computer component 102 may include a plurality of qubits 104, as described above in connection with FIG. 1. A single qubit may represent a one, a zero, or any quantum superposition of those two qubit states. The classical computer component 304 may provide classical state preparation signals 332 to the quantum computer 102, in response to which the quantum computer 102 may prepare the states of the qubits 104 in any of the ways disclosed herein, such as in any of the ways disclosed in connection with FIGS. 1 and 2A-2B.

Once the qubits 104 have been prepared, the classical processor 308 may provide classical control signals 334 to the quantum computer 102, in response to which the quantum computer 102 may apply the gate operations specified by the control signals 332 to the qubits 104, as a result of which the qubits 104 arrive at a final state. The measurement unit 110 in the quantum computer 102 (which may be implemented as described above in connection with FIGS. 1 and 2A-2B) may measure the states of the qubits 104 and produce measurement output 338 representing the collapse of the states of the qubits 104 into one of their eigenstates. As a result, the measurement output 338 includes or consists of bits and therefore represents a classical state. The quantum computer 102 provides the measurement output 338 to the classical processor 308. The classical processor 308 may store data representing the measurement output 338 and/or data derived therefrom in the classical memory 310.

The steps described above may be repeated any number of times, with what is described above as the final state of the qubits 104 serving as the initial state of the next iteration. In this way, the classical computer 304 and the quantum computer 102 may cooperate as co-processors to perform joint computations as a single computer system.

Although certain functions may be described herein as being performed by a classical computer and other functions may be described herein as being performed by a quantum computer, these are merely examples and do not constitute limitations of the present invention. A subset of the functions which are disclosed herein as being performed by a quantum computer may instead be performed by a classical computer. For example, a classical computer may execute functionality for emulating a quantum computer and provide a subset of the functionality described herein, albeit with functionality limited by the exponential scaling of the simulation. Functions which are disclosed herein as being performed by a classical computer may instead be performed by a quantum computer.

The techniques described above may be implemented, for example, in hardware, in one or more computer programs tangibly stored on one or more computer-readable media, firmware, or any combination thereof, such as solely on a quantum computer, solely on a classical computer, or on a hybrid quantum-classical (HQC) computer. The techniques disclosed herein may, for example, be implemented solely on a classical computer, in which the classical computer emulates the quantum computer functions disclosed herein.

The techniques described above may be implemented in one or more computer programs executing on (or executable by) a programmable computer (such as a classical computer, a quantum computer, or an HQC) including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention initialize parameters on a quantum computer. Such a process cannot be performed mentally or manually by a human.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

In embodiments in which a classical computing component executes a computer program providing any subset of the functionality within the scope of the claims herein, the computer program may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor, which may be either a classical processor or a quantum processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A classical computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium (such as a classical computer-readable medium, a quantum computer-readable medium, or an HQC computer-readable medium). Embodiments of the invention may store such data in such data structure(s) and read such data from such data structure(s).

What is claimed is:

1. A hybrid quantum-classical computer system comprising:
   a quantum computer comprising a plurality of qubits; and
   a classical computer including a processor, a non-transitory computer-readable medium, and computer instructions stored in the non-transitory computer-readable medium;
   wherein the computer instructions, when executed by the processor, perform a method for generating, on the hybrid quantum-classical computer, a variational quantum circuit comprising a set of gates and a set of initial parameters representing a model of a physical system, the model comprising a set of smaller contiguous subsystems which can be independently optimized, the method comprising:
   generating a set of quantum circuits having a set of circuit subcomponents with the same structure as the set of contiguous subsystems;
   optimizing each of the set of quantum circuits to minimize a property of the corresponding subsystem; and
   introducing at least one entangling gate between at least two circuit subcomponents in the set of circuit subcomponents.

2. The system of claim 1, wherein the physical system comprises a fermionic system.

3. The system of claim 1, wherein optimizing the set of circuit subcomponents comprises constraining each of circuit subcomponents in the set of circuit subcomponents to generate a state representing a fixed number of particles.

4. The system of claim 1, wherein the property of the corresponding subsystem is a ground state energy of the corresponding subsystem.

5. The system of claim 1, wherein the method further comprises truncating a depth of the quantum circuit for at least one circuit subcomponent.

6. The system of claim 1, wherein the physical system comprises a molecule.

7. The system of claim 6, wherein the method further comprises using the model to calculate a ground state energy of the molecule.

8. The system of claim 6, wherein the method further comprises using the model to map the absorption spectrum of the molecule.

9. The system of claim 6, wherein the method further comprises mapping physical properties of the molecule using the Jordan-Wigner transformation.

10. The system of claim 6, wherein the method further comprises mapping physical properties of the molecule using the Bravyi-Kitaev transformation.

11. The system of claim 1, wherein the method further includes tuning initial parameters of the circuit subcomponents in the set of circuit subcomponents by setting values of the initial parameters according to a parameter library.

12. The system of claim 1, wherein the method further includes tuning initial parameters of the circuit subcomponents in the set of circuit subcomponents by executing an optimization on the quantum computer.

13. The system of claim 12, wherein the optimization comprises a variational quantum eigensolver (VQE).

14. The system of claim 1, wherein the method further comprises:
optimizing the at least one entangling gate to minimize a global property of the system.

15. The system of claim 14, wherein the global property of the system is the same property as the property of the corresponding subsystems.

16. The system of claim 1, wherein optimizing each of the set of quantum circuits comprises tuning, on the quantum computer, a set of subcomponent parameters to generate a target state.

17. The system of claim 1, wherein generating a set of quantum circuits includes truncating the depth of the quantum circuit for at least one circuit subcomponent.

18. The system of claim 16, wherein the target state comprises an approximate target state.

19. The system of claim 16, wherein the target state is a minimum of a cost function of the physical system.

20. The system of claim 18, wherein the minimum of the cost function of the physical system is the ground state energy of the physical system.

21. The system of claim 16, wherein the tuning of the set of subcomponent parameters comprises setting each of the corresponding sets of subcomponent parameters according to a parameter library.

22. The system of claim 1, further comprising decomposing, on the classical computer, the model of the physical system into the set of smaller contiguous subsystems.

23. A method performed by a hybrid quantum-classical computer system, the hybrid quantum-classical computer system comprising:
a quantum computer comprising a plurality of qubits; and
a classical computer including a processor, a non-transitory computer-readable medium, and computer instructions stored in the non-transitory computer-readable medium;
wherein the computer instructions, when executed by the processor, perform the method to generate, on the hybrid quantum-classical computer, a variational quantum circuit comprising a set of gates and a set of initial parameters representing a model of a physical system, the model comprising a set of smaller contiguous subsystems which can be independently optimized, the method comprising:
generating a set of quantum circuits having a set of circuit subcomponents with the same structure as the set of contiguous subsystems;
optimizing each of the set of quantum circuits to minimize a property of the corresponding subsystem; and
introducing at least one entangling gate between at least two circuit subcomponents in the set of circuit subcomponents.

24. The method of claim 23, wherein the physical system comprises a fermionic system.

25. The method of claim 23, wherein optimizing the set of circuit subcomponents comprises constraining each of circuit subcomponents in the set of circuit subcomponents to generate a state representing a fixed number of particles.

26. The method of claim 23, wherein the property of the corresponding subsystem is a ground state energy of the corresponding subsystem.

27. The method of claim 23, further comprising truncating a depth of the quantum circuit for at least one circuit subcomponent.

28. The method of claim 23, wherein the physical system comprises a molecule.

29. The method of claim 28, further comprising using the model to calculate a ground state energy of the molecule.

30. The method of claim 28, further comprising using the model to map the absorption spectrum of the molecule.

31. The method of claim 28, further comprising mapping physical properties of the molecule using the Jordan-Wigner transformation.

32. The method of claim 28, further comprising mapping physical properties of the molecule using the Bravyi-Kitaev transformation.

33. The method of claim 23, further comprising tuning initial parameters of the circuit subcomponents in the set of circuit subcomponents by setting values of the initial parameters according to a parameter library.

34. The method of claim 23, further comprising tuning initial parameters of the circuit subcomponents in the set of circuit subcomponents by executing an optimization on the quantum computer.

35. The method of claim 34, wherein the optimization comprises a variational quantum eigensolver (VQE).

36. The method of claim 23, further comprising:
optimizing the at least one entangling gate to minimize a global property of the system.

37. The method of claim 36, wherein the global property of the system is the same property as the property of the corresponding subsystems.

38. The method of claim 23, wherein optimizing each of the set of quantum circuits comprises tuning, on the quantum computer, a set of subcomponent parameters to generate a target state.

39. The method of claim 23, wherein generating a set of quantum circuits includes truncating the depth of the quantum circuit for at least one circuit subcomponent.

40. The method of claim 38, wherein the target state comprises an approximate target state.

41. The method of claim 38, wherein the target state is a minimum of a cost function of the physical system.

42. The method of claim 40, wherein the minimum of the cost function of the physical system is the ground state energy of the physical system.

43. The method of claim 38, wherein the tuning of the set of subcomponent parameters comprises setting each of the corresponding sets of subcomponent parameters according to a parameter library.

44. The method of claim 23, further comprising decomposing, on the classical computer, the model of the physical system into the set of smaller contiguous subsystems.

* * * * *